(12) United States Patent
Hoffman et al.

(10) Patent No.: US 10,807,280 B2
(45) Date of Patent: Oct. 20, 2020

(54) METHOD OF EXTRACTING A TOOLING MANDREL FROM A COMPOSITE LAMINATE CAVITY

(71) Applicant: The Boeing Company, Chicago, IL (US)

(72) Inventors: Peter L. Hoffman, Chesterfield, MO (US); Peter D. McCowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 14/746,023

(22) Filed: Jun. 22, 2015

(65) Prior Publication Data

US 2016/0368174 A1 Dec. 22, 2016

(51) Int. Cl.
*B29C 33/48* (2006.01)
*B29C 33/04* (2006.01)
(Continued)

(52) U.S. Cl.
CPC .............. *B29C 33/04* (2013.01); *B29C 33/44* (2013.01); *B29C 37/0017* (2013.01);
(Continued)

(58) Field of Classification Search
CPC .......... B29C 33/505; B29C 2043/3652; B29C 70/446; B29C 2043/3649; B29C 2043/3665; B29C 33/04; B29C 2033/042; B29C 2035/042–044; B29C 2035/1616–165; B29C 2043/3621; B29C 2043/3626; B29C 2043/028; B29C 70/462; B29C 70/46–48; B29C 70/34–347; F28F 2210/02; F28F 2210/06; F28F 2210/08; F28F 2250/04; F28F 2250/10; F28F 2250/102; F28F 2250/104;
(Continued)

(56) References Cited

U.S. PATENT DOCUMENTS 4,388,263 A * 6/1983 Prunty .................... B29C 43/32
249/127
5,070,606 A * 12/1991 Hoopman ........... B29C 33/0033
205/138
(Continued)

FOREIGN PATENT DOCUMENTS

CN 101180176 5/2008
CN 104015919 9/2014
(Continued)

OTHER PUBLICATIONS

EPO, EESR for EP16171182, dated Dec. 5, 2016.
(Continued)

*Primary Examiner* — Matthew J Daniels
*Assistant Examiner* — Andrew L Swanson

(57) ABSTRACT

A tooling mandrel for manufacturing a composite structure may include a mandrel body having a fluid passage network formed within the mandrel body for passing a fluid medium through the mandrel body. The fluid passage network may have a passage cross-sectional area shaped to promote thermal conductance between the fluid medium and the tooling mandrel and cause a change in a mandrel cross-sectional shape.

20 Claims, 14 Drawing Sheets

(51) Int. Cl.
*B29C 70/54* (2006.01)
*B29C 37/00* (2006.01)
*B29C 33/44* (2006.01)
*B29C 70/44* (2006.01)
*B29C 53/82* (2006.01)

(52) U.S. Cl.
CPC .......... *B29C 53/824* (2013.01); *B29C 70/446* (2013.01); *B29C 70/54* (2013.01); *B29C 33/48* (2013.01); *B29C 33/485* (2013.01)

(58) Field of Classification Search
CPC .. F28F 2250/106; F28F 2250/108; F28F 1/40; B29D 99/0017; B29D 99/0021
See application file for complete search history.

(56) References Cited

U.S. PATENT DOCUMENTS

| | | | | |
|---|---|---|---|---|
| 5,116,218 | A * | 5/1992 | Jourdain | B29C 33/44 249/144 |
| 5,387,098 | A * | 2/1995 | Willden | B29C 53/82 264/257 |
| 5,900,194 | A * | 5/1999 | Ashton | B29C 33/44 264/257 |
| 6,253,835 | B1 * | 7/2001 | Chu | F28F 3/12 165/104.33 |
| 7,293,737 | B2 | 11/2007 | Engwall et al. | |
| 7,530,530 | B2 | 5/2009 | Engwall et al. | |
| 7,824,171 | B2 | 11/2010 | Hanson et al. | |
| 7,897,004 | B2 | 3/2011 | Engwall et al. | |
| 8,293,051 | B2 | 10/2012 | Morris et al. | |
| 8,394,310 | B2 | 3/2013 | Hanson et al. | |
| 8,523,553 | B2 * | 9/2013 | Martin | B29C 33/40 249/184 |
| 8,534,339 | B2 | 9/2013 | Pham et al. | |
| 8,800,953 | B2 | 8/2014 | Morris et al. | |
| 2002/0069962 | A1 * | 6/2002 | Maxwell | B29C 70/086 156/286 |
| 2010/0009124 | A1 * | 1/2010 | Robins | B29C 70/54 428/156 |
| 2010/0051182 | A1 * | 3/2010 | Graham | B29C 33/04 156/187 |
| 2010/0139850 | A1 | 6/2010 | Morris et al. | |
| 2011/0042863 | A1 * | 2/2011 | Cavaliere | B29C 33/3821 264/500 |
| 2011/0094663 | A1 * | 4/2011 | Guille | B29C 33/505 156/242 |
| 2011/0206875 | A1 * | 8/2011 | Kohlen | B29C 33/485 428/34.1 |
| 2013/0004698 | A1 * | 1/2013 | Stillwell | B29C 33/04 428/68 |
| 2013/0139945 | A1 * | 6/2013 | Buerkner | B29C 33/505 156/60 |
| 2013/0206324 | A1 * | 8/2013 | Blot | B29C 70/32 156/173 |
| 2014/0246141 | A1 * | 9/2014 | Oldroyd | B29C 33/02 156/175 |

FOREIGN PATENT DOCUMENTS

| | | | |
|---|---|---|---|
| DE | 102005051709 A1 * | 5/2007 | ................ F28F 7/02 |
| DE | 102006031335 | 1/2008 | |
| EP | 2772345 | 9/2014 | |
| JP | 59066648 A * | 4/1984 | ........... F24H 9/0026 |
| WO | WO-9848768 A1 * | 11/1998 | ........... A61K 8/0212 |

OTHER PUBLICATIONS

Chinese Patent Office, Search Report and Office Action for 2016103501449, dated Jun. 21, 2019.
Chinese Patent Office, Search Report and Office Action for 2016103501449, dated Jan. 13, 2020.

* cited by examiner

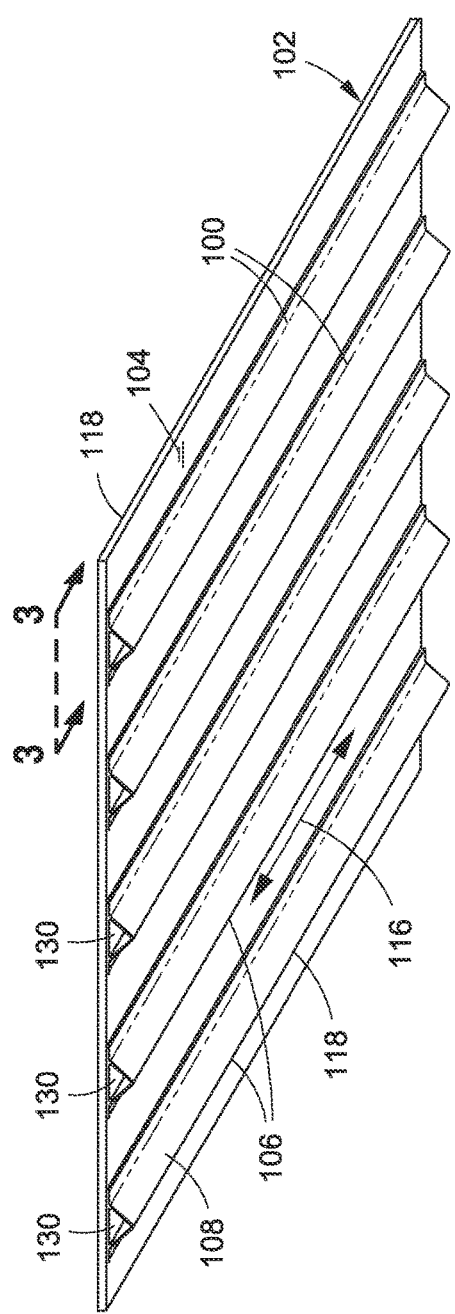
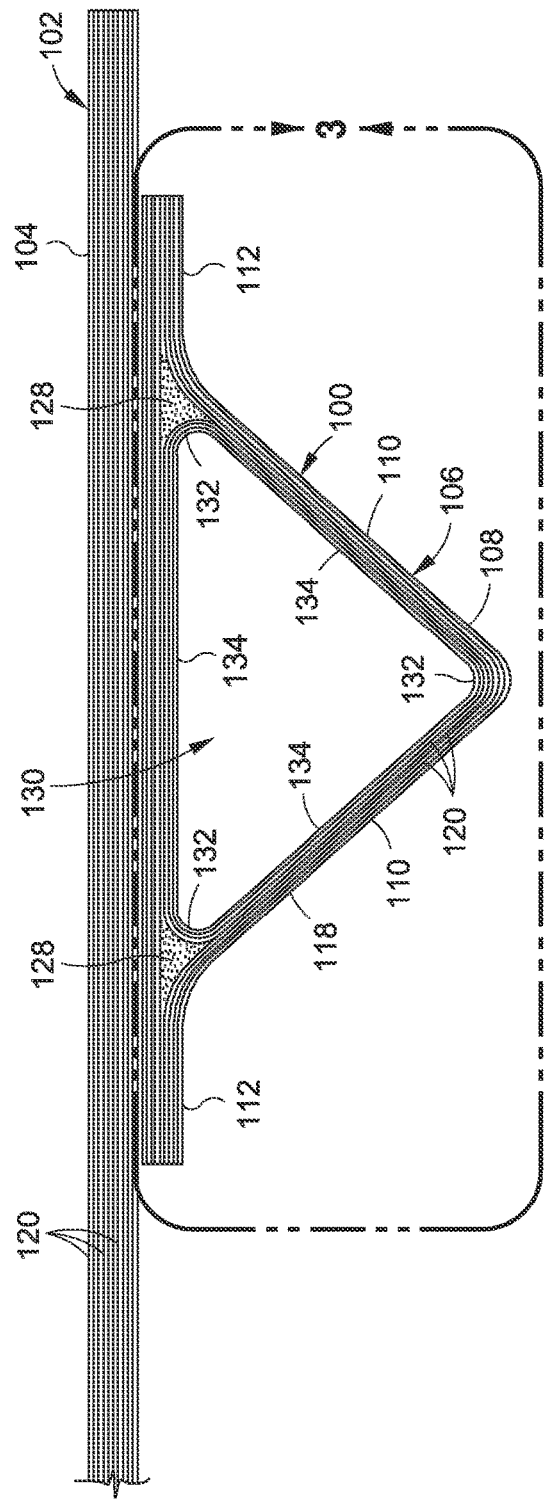

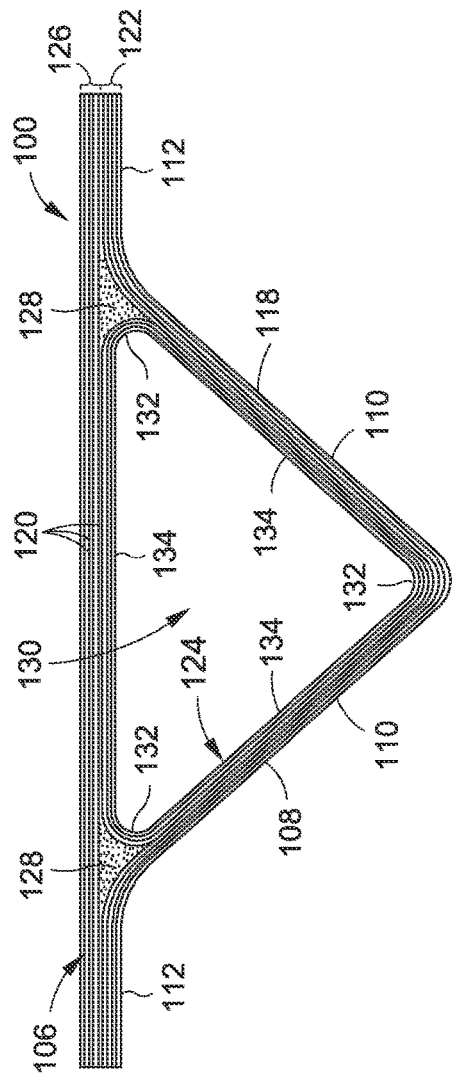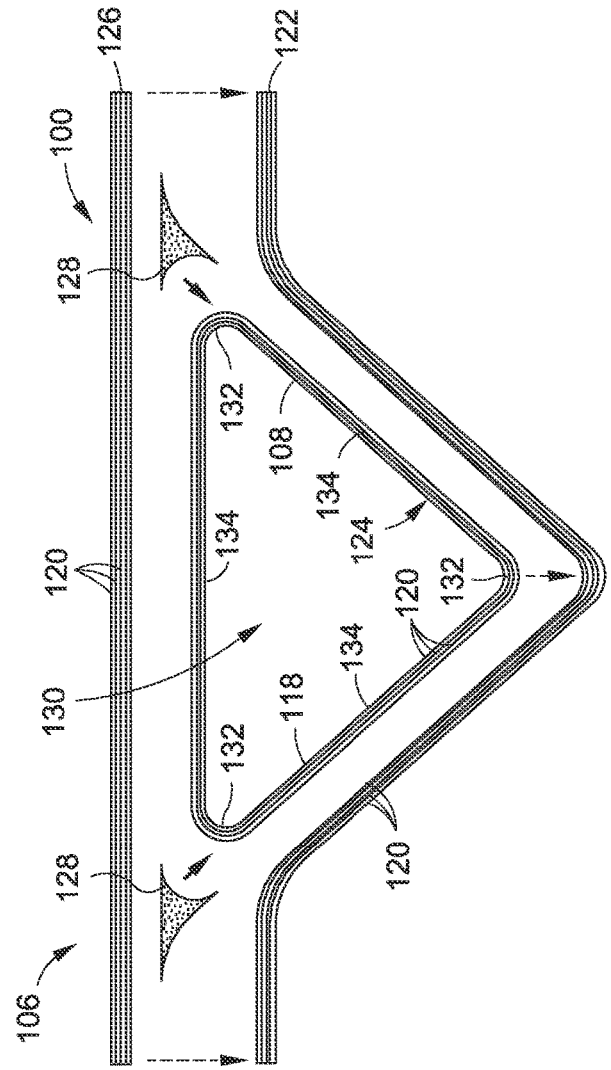

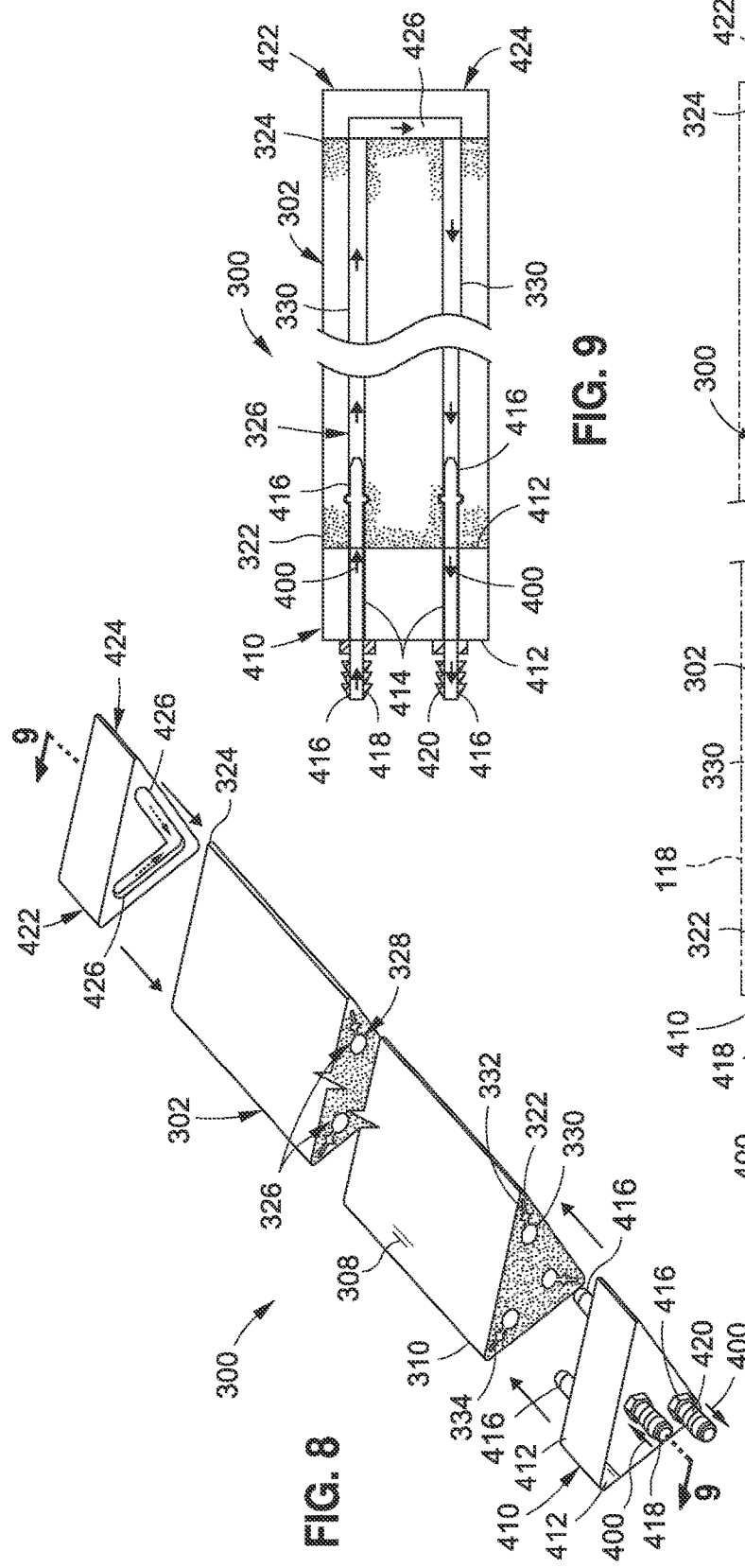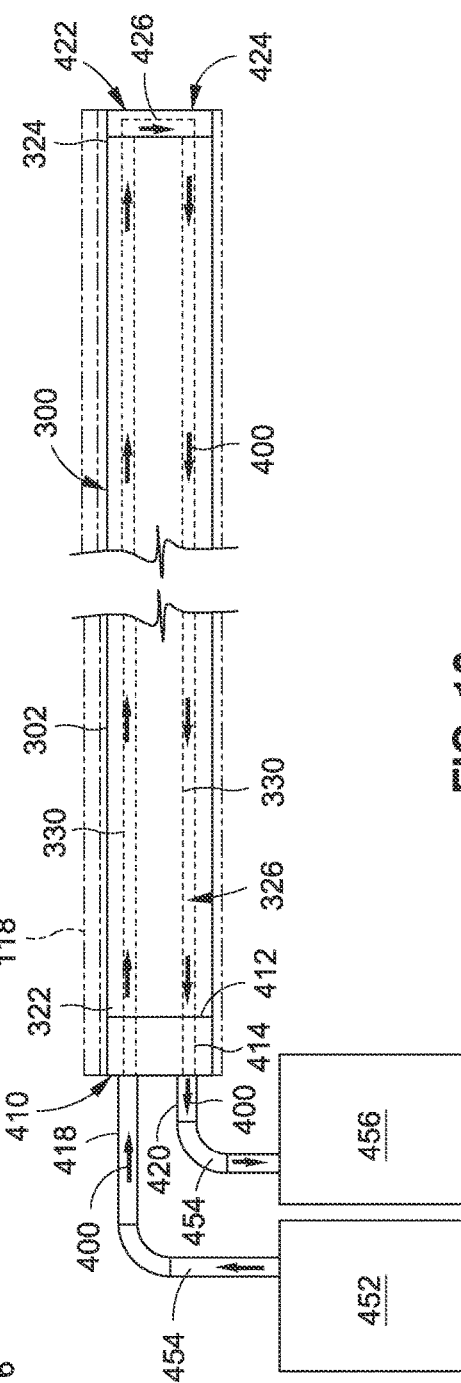
FIG. 8
FIG. 9
FIG. 10

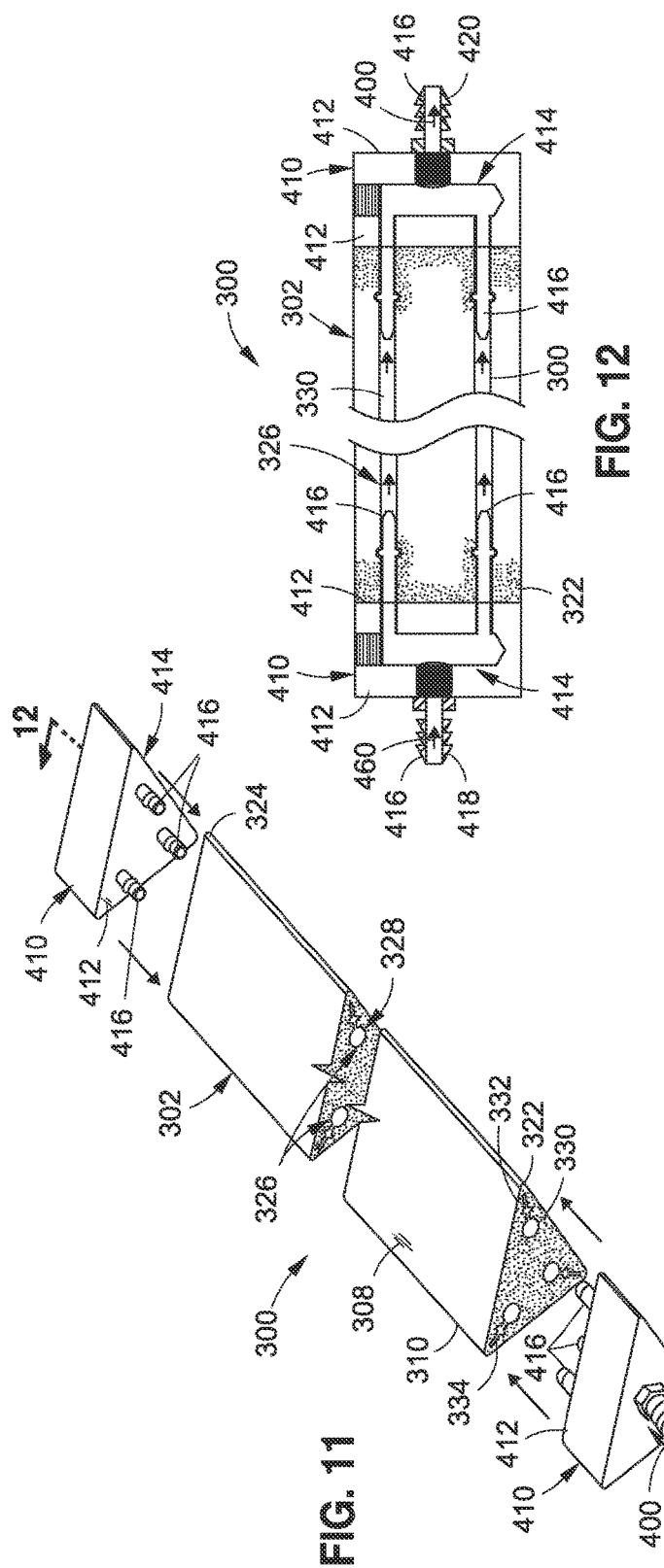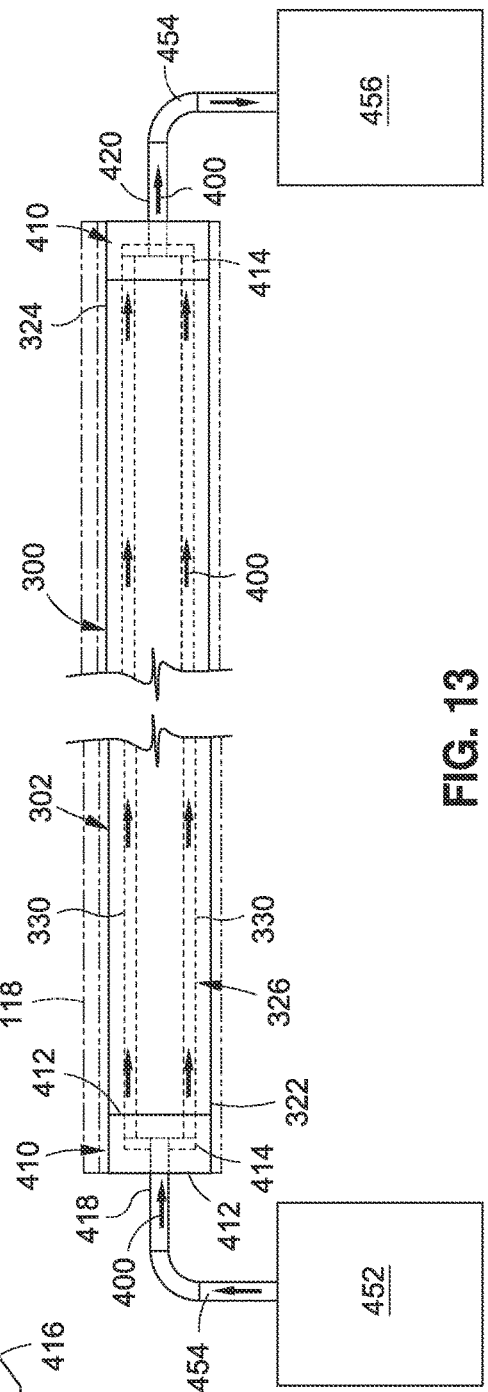

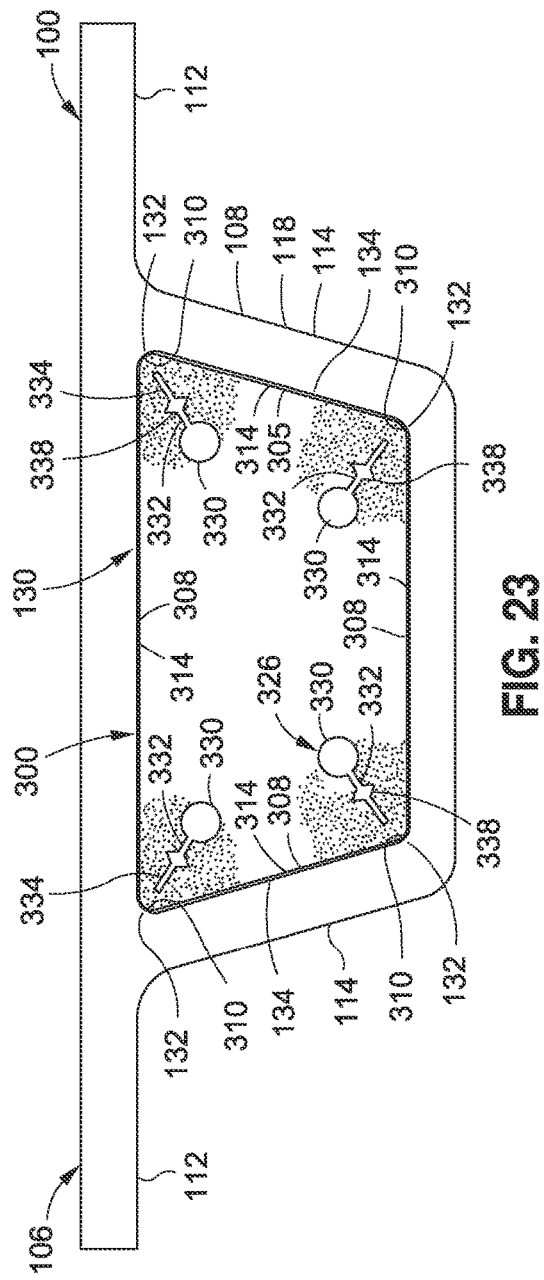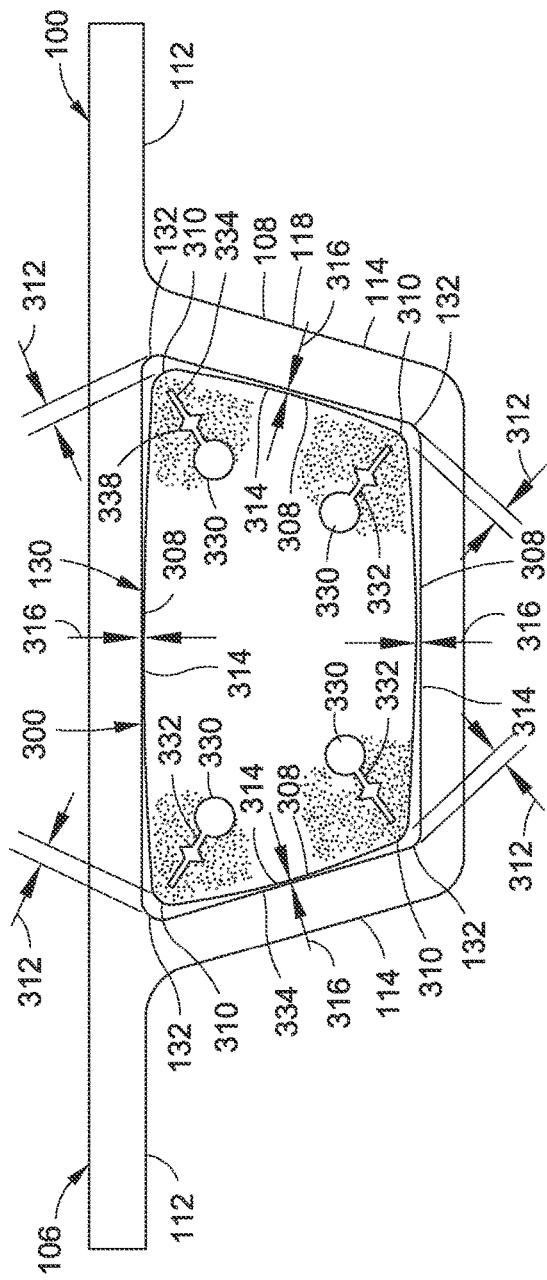

METHOD OF EXTRACTING A TOOLING MANDREL FROM A COMPOSITE LAMINATE CAVITY

FIELD

The present disclosure relates generally to the manufacturing of composite structures and, more particularly, to methods and apparatus for reducing an extraction force required for removing a tooling mandrel from a composite laminate cavity following a cure cycle of a composite laminate.

BACKGROUND

The manufacturing of a composite structure may involve the application of heat and compaction pressure to a composite laminate during a cure cycle. Some composite laminates may include a cavity that must be supported during the application of compaction pressure. Toward this end, a tooling mandrel may be provided inside the composite laminate cavity. For example, a plurality of composite plies may be laid up around the tooling mandrel to form the composite laminate which may then be subjected to the cure cycle with the tooling mandrel inside the composite laminate. After the composite laminate is cured, the tooling mandrel may be removed by applying an extraction tension force on the mandrel end to pull the tooling mandrel out of the composite laminate cavity.

In some cases, removal of a tooling mandrel from a composite laminate may be resisted by high-stick friction that may exist at the interface between the tooling mandrel and the composite laminate cavity. Such high-stick friction may develop during cure as a result of resin deposits between the outer surface of the tooling mandrel and the inner surface of the composite laminate cavity. Applying a large extraction force on the tooling mandrel to overcome the high-stick friction may not be desirable for either the cured composite structure or the tooling mandrel.

As can be seen, there exists a need in the art for an apparatus and method for reducing the magnitude of the extraction force required for removing a tooling mandrel from a composite laminate cavity following curing of the composite laminate.

SUMMARY

The above-noted needs associated with removing a tooling mandrel from a composite laminate cavity are specifically addressed and alleviated by the present disclosure which provides a tooling mandrel having a mandrel body for a composite laminate cavity. The mandrel body may include a fluid passage network for passing a fluid medium through the mandrel body. The fluid passage network may have a passage cross-sectional area shaped to promote thermal conductance between the fluid medium and the tooling mandrel and cause a change in a mandrel cross-sectional shape to facilitate removal of the tooling mandrel from the composite laminate cavity.

In a further embodiment, disclosed is a tooling mandrel including a mandrel body having a fluid passage network formed in the mandrel body. The tooling mandrel may include a fluid interface operably coupled to the mandrel body for supplying a fluid medium from a fluid source to the fluid passage network. The fluid passage network may have a passage cross-sectional area shaped to promote heat transfer between the fluid medium and the tooling mandrel and causing a change in a mandrel cross-sectional shape to facilitate removal of the tooling mandrel from the cavity.

In addition, disclosed is a method of method of extracting a tooling mandrel from a composite laminate cavity. The method may include processing a composite laminate having a tooling mandrel located in a composite laminate cavity. The tooling mandrel may have a fluid passage network. The method may further include controlling thermal contraction of the tooling mandrel. In addition, the method may include breaking high-stick friction between the tooling mandrel and the composite laminate cavity in response to controlling thermal contraction of the tooling mandrel.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is perspective view illustration of a stiffened composite skin panel including one or more composite structures that may be manufactured using one or more examples of a tooling mandrel and method disclosed herein;

FIG. 3 is an end view illustration of a portion of a stiffened composite skin panel taken along line 3 of FIG. 2 and illustrating a triangle section composite stiffener coupled to a composite skin;

FIG. 4 is an end view illustration of a composite stiffener taken along line 4 of FIG. 3 and illustrating the triangle section composite stiffener;

FIG. 5 is an exploded illustration of the composite stiffener of FIG. 4 comprised of a V-shaped primary laminate, a triangle-shaped wrap laminate, and a planar base laminate assembled with a pair of radius fillers;

FIG. 8 is a perspective view illustration of an example of a tooling mandrel having a fluid interface on a first mandrel end and a return fitting on a second mandrel end;

FIG. 9 is a sectional view taken along line 9 of FIG. 8 and illustrating the return fitting on the second mandrel end fluidly coupling two or more primary flow passages such that the fluid medium in at least one of the primary flow passages flows opposite the fluid medium in another one of the primary flow passages;

FIG. 10 is a diagrammatical illustration of the tooling mandrel of FIGS. 8 and 9 showing the flow of the fluid medium into an out of the fluid interface at the first mandrel end;

FIG. 11 is a perspective view illustration of an example of a tooling mandrel having a fluid interface on each of a first mandrel end and a second mandrel end;

FIG. 12 is a sectional view taken along line 12 of FIG. 11 and illustrating the fluid interface mounted to the first mandrel end and a fluid interface mounted to the second mandrel end;

FIG. 13 is a diagrammatical illustration of the tooling mandrel of FIGS. 11 and 12 showing the flow of the fluid medium into the first mandrel end and out of the second mandrel end;

FIG. 23 is an illustration of an example of a tooling mandrel inside a hat section composite stiffener prior to cure;

FIG. 24 is an illustration of the tooling mandrel of FIG. 23 after cure and prior to mandrel extraction and illustrating a vertex gap between each vertex and the corresponding inside radius of the composite laminate cavity;

DETAILED DESCRIPTION

Figure 1:
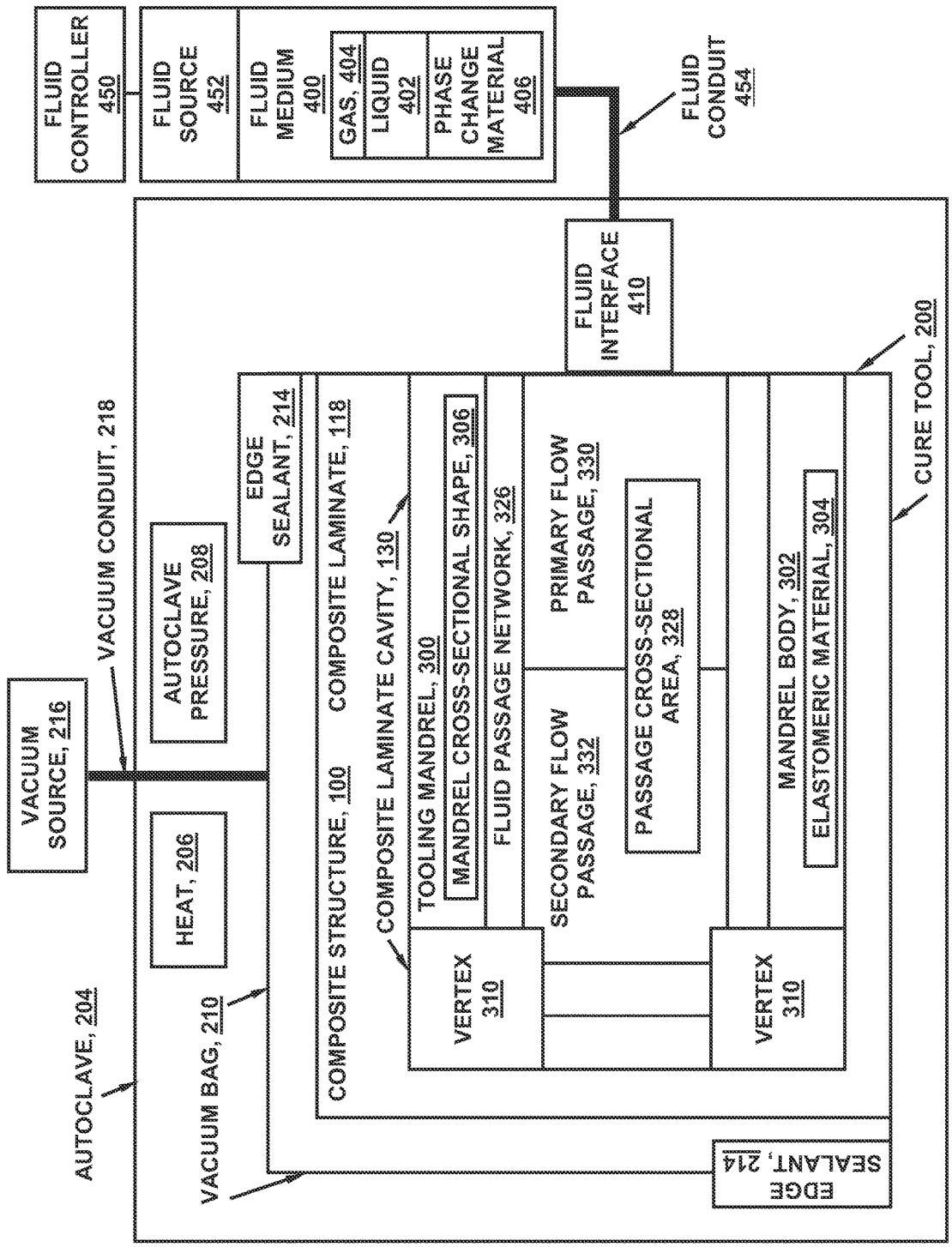
FIG. 1 is an illustration of a functional block diagram of a system for reducing extraction force required for removing a tooling mandrel from a composite laminate cavity of a composite structure.

Referring now to the drawings wherein the showings are for purposes of illustrating various embodiments of the present disclosure, shown in FIG. 1 is an illustration of a functional block diagram of a system for reducing extraction force for removing a tooling mandrel 300 from a composite laminate cavity 130 of a composite structure 100. In some examples, the composite structure 100 may be configured as a composite laminate 118 formed of a plurality of composite plies 120 (FIG. 3) as described below. However, in other examples, the composite structure 100 may be configured as a non-laminated composite structure (not shown) such as may be formed using a single-layer fiber preform (not shown) wrapped around a tooling mandrel 300 and which may be preimpregnated with matrix material (not shown) or provided as dry fabric (not shown) for infusion with matrix material (not shown) prior to curing.

FIG. 1 illustrates a composite laminate 118 positioned within an autoclave 204. The composite laminate 118 may include a composite laminate cavity 130. A tooling mandrel 300 may be located within the composite laminate cavity 130. The tooling mandrel 300 may include a mandrel body 302. A fluid passage network 326 may be formed within the mandrel body 302 for passing a fluid medium 400 through the mandrel body 302. The fluid passage network 326 may include one or more primary flow passages 330. The fluid passage network 326 may further include one or more secondary flow passages 332. In some examples, a primary flow passage 330 and/or a secondary flow passage 332 may be located proximate a vertex 310 of the tooling mandrel 300.

Referring still to FIG. 1, a fluid medium 400 may be provided to the fluid passage network 326. The fluid medium 400 may be contained within a fluid source 452 which may be fluidly coupled to a fluid interface 410 by a fluid conduit 454. The fluid interface for 10 may be mounted to the tooling mandrel 300. The flow of the fluid medium 400 into the fluid passage network 326 may be controlled by a fluid controller 450. The fluid medium 400 may be a gas 404, a liquid 402, a phase change material 406, or any other type of fluid medium 400 that may facilitate heat transfer between the tooling mandrel 300 and the fluid medium 400.

In FIG. 1, the composite laminate 118 containing the tooling mandrel 300 may be positioned against a cure tool 200 for curing the composite laminate 118. In some examples, the composite laminate 118 may be cured inside an autoclave 204. A vacuum bag 210 may seal the composite laminate 118 to the cure tool 200 using edge sealant 214. A vacuum source 216 may be fluidly coupled to the vacuum bag 210 using a vacuum conduit 218 to apply a vacuum (not shown) to the vacuum bag 210 to facilitate the application of autoclave pressure 208 to the composite laminate 118. Heat 206 may also be applied to facilitate curing of the composite laminate 118 at an elevated temperature.

Following curing of the composite laminate 118, a fluid medium 400 may be introduced into the fluid passage network 326 of the tooling mandrel 300 such as via a fluid interface 410. The fluid passage network 326 may have a passage cross-sectional area 328 sized and shaped to facilitate thermal conductance (e.g., heat transfer) between the fluid medium 400 and the tooling mandrel 300. Heat transfer between the fluid medium 400 and the tooling mandrel 300 may cause a change in a mandrel cross-sectional shape 306 due to thermal contraction or thermal expansion of the tooling mandrel 300. For example, after cure of the composite laminate 118, a fluid medium 400 may be introduced into the fluid passage network 326 at a temperature that is lower than the temperature of the tooling mandrel 300. Heat transfer from the tooling mandrel 300 to the fluid medium 400 may cause thermal contraction of the mandrel cross-sectional shape 306 which may facilitate extraction of the tooling mandrel 300 from the composite laminate cavity 130, as described in greater detail below.

In other examples, a fluid medium 400 (FIG. 1) may be introduced into the fluid passage network 326 (FIG. 1) at a temperature that is higher than the temperature of the tooling mandrel 300 (FIG. 1). For example, prior to or during cure, a fluid medium 400 may be introduced into the tooling mandrel 300 for internally heating the tooling mandrel 300 to cause thermal expansion of the mandrel cross-sectional shape 306 (FIG. 1). Thermal expansion of the mandrel cross-sectional shape 306 may facilitate or promote the application of compaction pressure (not shown) to the composite laminate and which may facilitate or augment the application of autoclave pressure 208 (FIG. 1) to the composite laminate 118 (FIG. 1) during cure.

In another example not shown, the fluid medium 400 (FIG. 1) may be a phase change material 406 (FIG. 1) configured to change from a liquid state (not shown) to a solid or semi-solid state (not shown) upon heat-up of the phase change material 406 due to external heating of the composite laminate 118 (FIG. 1) to a cure temperature (not shown) such as in an oven (not shown) or autoclave 204 (FIG. 1). In this regard, the phase change material 406 may be introduced into the fluid passage network 326 (FIG. 1) of a tooling mandrel 300 (FIG. 1) prior to or during a cure cycle. An increase in temperature of the phase change material 406 due to external heating in an autoclave 204 may result in the phase change material 406 transitioning from a liquid state to a solid or semi-solid state with a corresponding thermal expansion of the phase change material 406 within the fluid passage network 326. The thermal expansion of the phase change material 406 within the fluid passage network 326 may cause the outer surfaces of the tooling mandrel 300 to increase the compaction pressure (not shown) that may be externally applied to the composite laminate 118 (FIG. 1) during cure such as via autoclave pressure (FIG. 1) on the composite laminate 118.

Following cure, external heating (not shown) of the composite laminate 118 may be discontinued causing a reduction in the temperature of the composite laminate 118 and the phase change material 406. The phase change material 406 may transition from a solid or semi-solid (not shown) back to a liquid state (not shown) with corresponding thermal contraction of the phase change material 406. Thermal contraction of the tooling mandrel 300 and the phase change material 406 contained within tooling mandrel 300 may facilitate or allow for extraction of the tooling mandrel 300 from the composite laminate cavity 130 (FIG. 1) of the composite laminate 118 (FIG. 1).

FIG. 2 is perspective view illustration of a stiffened composite skin panel 102 having one or more composite structures 100 that may be manufactured using the tooling mandrel 300 (FIG. 1) and/or method 500 (FIG. 25) disclosed herein. The stiffened composite skin panel 102 may include a composite skin 104 and a plurality of composite stiffeners 106 that may be coupled to the composite skin 104. The composite stiffeners 106 may extend along a lengthwise direction 116 (FIG. 2) of the composite skin 104. In the example shown, each one of the composite stiffeners 106 is formed as a triangle section 108 composite laminate 118 having a triangle-shaped composite laminate cavity 130. However, it should be noted that the tooling mandrel 300 (FIG. 1) and/or method 500 (FIG. 25) disclosed herein may be implemented for manufacturing composite structures 100 of any cross-sectional size, shape, and configuration, having a cavity requiring support during compaction and curing of the composite structure 100.

FIG. 3 is an end view illustration of a portion of the stiffened composite skin panel 102 of FIG. 2 showing a composite stiffener 106 coupled to the composite skin 104. The composite stiffener 106 may be co-bonded or co-cured to the composite skin 104. In the example shown, the composite skin 104 may be formed as a laminate of composite plies 120. Likewise, the composite stiffener 106 may be formed as a laminate of composite plies 120.

FIG. 4 is an end view illustration of the composite stiffener 106 of FIG. 3 removed from the composite skin 104 (FIG. 3) and showing the composite stiffener 106 formed as a triangle section 108 composite laminate 118. In the example shown, the composite laminate 118 may include a pair of webs 110 extending downwardly from an opposing pair of flanges 112 and defining a composite laminate cavity 130. The webs 110 may intersect one another forming and inside radius 132 at the intersection of the webs 110. An inside radius 132 may also be formed at the intersection of each web 110 and flange 112. The composite laminate cavity 130 may include flats 134 extending between the inside radii 132.

In the present disclosure, a composite laminate cavity 130 (FIG. 1) may be formed in any one of a variety of different sizes, shapes, and configurations, depending upon the geometry of the tooling mandrel 300 (FIG. 1). In this regard, a composite laminate cavity 130 may contain any number of inside corners (not shown) or inside radii 132 (FIG. 4) and any number of flats 134 (FIG. 4) or non-flat portions (not shown). For example, the triangle section 108 composite laminate 118 of FIG. 4 has a composite laminate cavity 130 containing three (3) vertices 310 forming three (3) acute angles relative to the flats 134. In a further example, a hat section 114 composite laminate 118 (FIG. 23) may have a trapezoidal cross-sectional shape having four (4) vertices 310 (FIG. 23) forming two (2) acute angles and two (2) obtuse angles relative to the flats 134 (FIG. 23) as shown in FIGS. 23-24 and described below. The acute angles may present challenges in removing the tooling mandrel 300 from the composite laminate cavity 130 following curing of the composite laminate 118 due to high-stick friction that may exist between the vertices 310 of the tooling mandrel 300 and the inside radii 132 (FIG. 4) at the acute angles. Advantageously, the presently-disclosed tooling mandrel 300 provides a means for thermal contraction of the tooling mandrel 300 such as in the vertices 310 to reduce or eliminate high-stick friction (not shown) at the acute angles and thereby facilitate extraction of the tooling mandrel 300 from the composite laminate cavity 130 with reduced extraction force (not shown).

FIG. 5 is an exploded illustration of the triangle section 108 composite laminate 118 of FIG. 4 comprised of a V-shaped primary laminate 122, a triangle-shaped wrap laminate 124, and a planar base laminate 126 assembled with radius fillers 128 (e.g., noodles). The tooling mandrel 300 (omitted for clarity—see FIG. 6) may be implemented for laying up the wrap laminate 124. For example, a plurality of composite plies 120 formed of uncured, preimpregnated fiber-reinforced thermosetting or thermoplastic polymer matrix material (e.g., prepreg—not shown) may be laid up over the tooling mandrel 300 to form the wrap laminate 124.

Likewise, composite plies 120 may be laid up on a cure tool cavity 202 (see FIG. 6) to form the primary laminate 122. A stack of composite plies 120 may be laid up on a planar tool (not shown) to form the base laminate 126. The radius fillers 128 may be formed of composite plies 120, bundled unidirectional fiber tows or rovings (not shown), or other material. The composite laminate 118 (e.g., the primary laminate 122, the wrap laminate 124, and/or the base laminate 126) may also be formed of dry fiber material (not shown) which may be later infused with resin (not shown) prior to cure.

Figure 6:
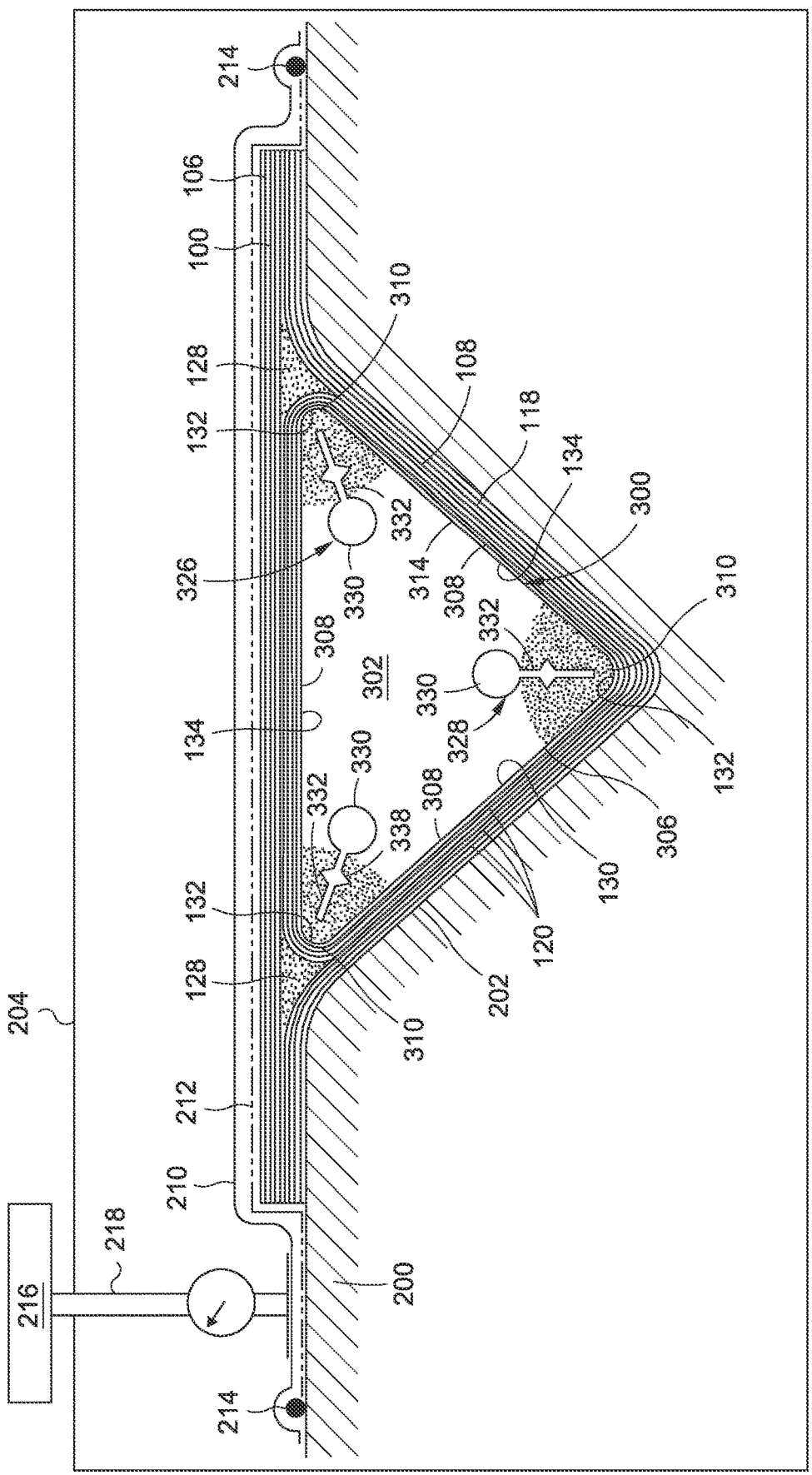
FIG. 6 is an end view illustration of an example of a tooling mandrel of the present disclosure positioned within a composite laminate cavity of the composite stiffener of FIG. 5 installed in a cure tool and vacuum-bagged prior to cure.

FIG. 6 is an end view illustration of an example of the assembled composite laminate 118 of FIG. 5 prior to cure. In the example shown, the composite laminate 118 is installed in a cure tool cavity 202 of a cure tool 200. However, in other embodiments not shown, the composite laminate 118 may be installed on a cure tool 200 that lacks a cure tool cavity 202. In this regard, the presently-disclosed tooling mandrel 300 may be included in a composite laminate cavity 130 of a composite laminate 118 for curing on a flat cure tool (not shown) or curved cure tool (not shown). As mentioned above, the composite laminate 118 includes a tooling mandrel 300 which, in some examples, may be implemented for laying up the wrap laminate 124 (FIG. 5) prior to assembly with the base laminate 126 (FIG. 5), the primary laminate 122 (FIG. 5), and radius fillers 128 (FIG. 5). In one example, the tooling mandrel 300 may be configured as a one-piece tooling mandrel 300 extending along a lengthwise direction 116 (FIG. 2) of the composite stiffener 106. However, in an embodiment not shown, the tooling mandrel 300 may be provided in a multi-piece arrangement (not shown) having lengthwise sections (not shown) joined end-to-end to form a continuous fluid passage network 326 (FIG. 6) along a lengthwise direction 116 (FIG. 2) of the tooling mandrel (FIG. 6).

Referring still to FIG. 6, the triangle-shaped tooling mandrel 300 may include three (3) vertices 310 corresponding to the three (3) inside radii 132 of the composite laminate cavity 130. Each inside radius 132 of the composite laminate cavity 130 may be sized and shaped complementary to the size and shape of the vertices 310 of the tooling mandrel 300. In this regard, the cross-sectional size and shape of the composite laminate cavity may match the mandrel cross-sectional shape 306 as a result of laying up the wrap laminate 124 (FIG. 5) over the tooling mandrel 300. In this regard, prior to cure and/or prior to providing the fluid medium 400 to the fluid passage network 326 in the mandrel body 302, the outer surfaces (not shown) of the tooling mandrel 300 may be in intimate contact with the inner surfaces (not shown) of the composite laminate cavity 130. As indicated above, the mandrel body 302 includes the fluid passage network 326 which may extend along the lengthwise direction 116 (FIG. 2) of the mandrel body 302. The fluid passage network 326 may include one or more primary flow passages 330, one or more of which may include secondary flow passages 332, as described in greater detail below.

The tooling mandrel 300 may be formed by any one of a variety of different manufacturing processes. For example, the mandrel cross-sectional shape 306 (FIG. 1) and the fluid passage network 326 (FIG. 6) within the tooling mandrel 300 may be formed by an extrusion process (not shown). Such an extrusion process may form the primary flow passages 330 and/or the secondary flow passages 332 along the lengthwise direction 116 (FIG. 2) of the tooling mandrel 300. In some examples, the mandrel body 302 may have a generally constant mandrel cross-sectional shape 306 (FIG. 1) along the lengthwise direction 116 (FIG. 2). However, in other examples, the mandrel body 302 may have a non-constant cross-sectional shape (not shown).

In FIG. 6, the tooling mandrel 300 may include a primary flow passage 330 located proximate each vertex 310. Although the primary flow passages 330 are shown having a circular cross-sectional shape, the primary flow passages 330 may be provided in alternative cross-sectional shapes (e.g., rectangular, triangular, square, elliptical, etc.). In addition, although each one of the primary flow passages 330 are shown having a similar size, one or more of the primary flow passages 330 may be provided in a different size, shape, and/or configuration than the other primary flow passages 330. One or more of the primary flow passages 330 may include a secondary flow passage 332 which may be in fluid communication with the primary flow passage 330. In the example shown, each secondary flow passage 332 may extend from a primary flow passage 330 toward a vertex 310 of the tooling mandrel 300. The secondary flow passage 332 may increase the passage cross-sectional area 328 of the primary flow passage 330 which may result in an increase in thermal conductance (e.g., heat transfer) between the tooling mandrel 300 and the fluid medium 400 contained within or flowing along the primary flow passage 330 and/or secondary flow passage 332. In this regard, the secondary flow passages 332 may increase the surface area exposed to the fluid medium 400 (FIG. 1) facilitating a more rapid heat transfer from the tooling mandrel 300 (FIG. 1) to the fluid medium 400 similar to the increased surface area provided by fins (not shown), coils (not shown) or extended surface area (not shown) on refrigeration units (not shown).

In FIG. 6, the secondary flow passages 332 are shown having a slot shape 334 extending in a straight line from the primary flow passage 330 toward the vertex 310. One or more of the secondary flow passages 332 may optionally include additional geometry to facilitate heat transfer between the tooling mandrel 300 and the fluid medium 400 in the secondary flow passage 332. For example, the secondary flow passages 332 in FIG. 6 may include a diamond-shaped portion 338 for locally increasing the passage cross-sectional area 328 of the secondary flow passage 332. As may be appreciated, the secondary flow passage 332 may be provided in any one of a variety of alternative cross-sectional shapes, non-limiting examples of which are illustrated in FIGS. 14-18 and described below. Furthermore, a primary flow passage 330 may include two or more (not shown) secondary flow passages 332 extending outwardly from the primary flow passage 330.

In some embodiments, the primary flow passages 330 and/or the secondary flow passages 332 may facilitate heat transfer from the tooling mandrel 300 to the fluid medium 400 in a manner causing thermal contraction of the mandrel cross-sectional shape 306 relative to the composite laminate cavity 130, as mentioned above. For example, a fluid medium 400 at a temperature lower than the tooling mandrel 300 may be introduced into the fluid passage network 326 after cure of the composite laminate 118. Heat transfer from the tooling mandrel 300 to the fluid medium 400 in the primary flow passage 330 and/or secondary flow passages 332 of the fluid passage network 326 may cause thermal contraction of the mandrel cross-sectional shape 306 which may reduce or eliminate high-stick friction (not shown) between the tooling mandrel 300 and the composite laminate cavity 130, such as at the location of vertices 310 forming acute angles as mentioned above. The reduction or elimination of high-stick friction (not shown) may facilitate removal of the tooling mandrel 300 from the composite laminate cavity 130 with reduced extraction force (not shown). However, in other embodiments, a fluid medium 400 at a temperature higher than the tooling mandrel 300 may be introduced into the fluid passage network 326 such as prior to or during cure of the composite laminate 118. Heat transfer from the fluid medium 400 to the tooling mandrel 300 may cause thermal expansion of the mandrel cross-sectional shape 306 such as to facilitate the application of compaction pressure (not shown) on the composite plies 120 of the composite laminate 118 surrounding the tooling mandrel 300.

Referring still to FIG. 6, the mandrel body 302 may be formed of an elastomeric material 304 (FIG. 1) such as silicone, rubber, or other material. During debulking and/or curing of the composite laminate 118, the elastomeric material 304 of the mandrel body 302 may allow the mandrel body 302 to conform the composite laminate 118 to localized variations (not shown) that may be present in the contour (not shown) of the cure tool 200. In addition, the conforming of the mandrel body 302 may facilitate the removal of voids (not shown) or air pockets that may exists in the composite laminate 118 and may additionally facilitate the removal of wrinkles (not shown) from the composite plies 120 due to thermal expansion the tooling mandrel 300 causing straightening of fibers (not shown) in the composite plies 120. However, the mandrel body 302 may also be formed of non-elastomeric material (not shown) such as composite material (e.g., graphite-epoxy), stainless steel, aluminum, Invar™, or other material.

Referring to FIG. 6, the mandrel body 302 may be formed of any material that may facilitate the application of compaction pressure (not shown) to the composite laminate 118. In addition, the mandrel body 302 may be formed of a material that provides durability for use of the tooling mandrel 300 during multiple layup and cure cycles. In some examples, the mandrel body 302 may be formed of a material having a coefficient of thermal expansion (CTE) (not shown) that is compatible with the CTE (not shown) of the composite laminate 118 and/or the CTE (not shown) of the cure tool 200 for the cure temperature (not shown) of the composite laminate 118. In still other examples, the mandrel body 302 may be formed of a material that provides a predetermined amount of thermal growth (not shown) when heated to the cure temperature of the composite laminate 118 to provide additional compaction pressure (not shown) during curing of the composite laminate 118 and which may improve the strength and/or stiffness characteristics (not shown) of the composite laminate 118 (e.g., due to increased fiber volume fraction, reduced void content, etc.).

Referring still to FIG. 6, a vacuum bag 210 may seal the composite laminate 118 to the cure tool 200 using edge sealant 214 (e.g., vacuum sealant tape—not shown) in preparation for debulking and/or curing of the composite laminate 118. For example, edge sealant 214 may be applied to the cure tool 200 along a lengthwise direction 116 (FIG. 2) of the composite laminate 118 in addition to along the opposing ends (not shown) of the composite laminate 118 to seal the composite laminate 118 to the cure tool 200. The vacuum bag 210 may include one or more layers (not shown) of material to facilitate processing (e.g., debulking and/or curing) of the composite laminate 118. For example, a bleeder layer (not shown) may be included to absorb excess resin (not shown) and/or a breather layer 212 may be included to facilitate the evacuation of entrapped moisture (not shown) and gases (e.g., air, volatiles) and/or allow for the application of uniform compaction pressure (not shown) during debulking and/or curing of the composite laminate 118.

FIG. 6 illustrates the vacuum-bagged composite laminate 118, tooling mandrel 300, and cure tool 200 positioned within an autoclave 204 for applying heat 206 (FIG. 1) and autoclave pressure 208 (FIG. 1) to cure the composite laminate 118. A vacuum conduit 218 may fluidly couple the vacuum bag 210 to a vacuum source 216 which may be located internal or external to the autoclave 204. However, the presently-disclosed tooling mandrel 300 and method 500 (FIG. 25) may also be implemented in an out-of-autoclave process (not shown) using atmospheric pressure (not shown) which may be generated by applying a vacuum (not shown) to the vacuum bag 210. In some examples, heat 206 (FIG. 1) may be applied by positioning the vacuum-bagged composite laminate 118, tooling mandrel 300, and cure tool 200 in an oven (not shown).

Figure 7:
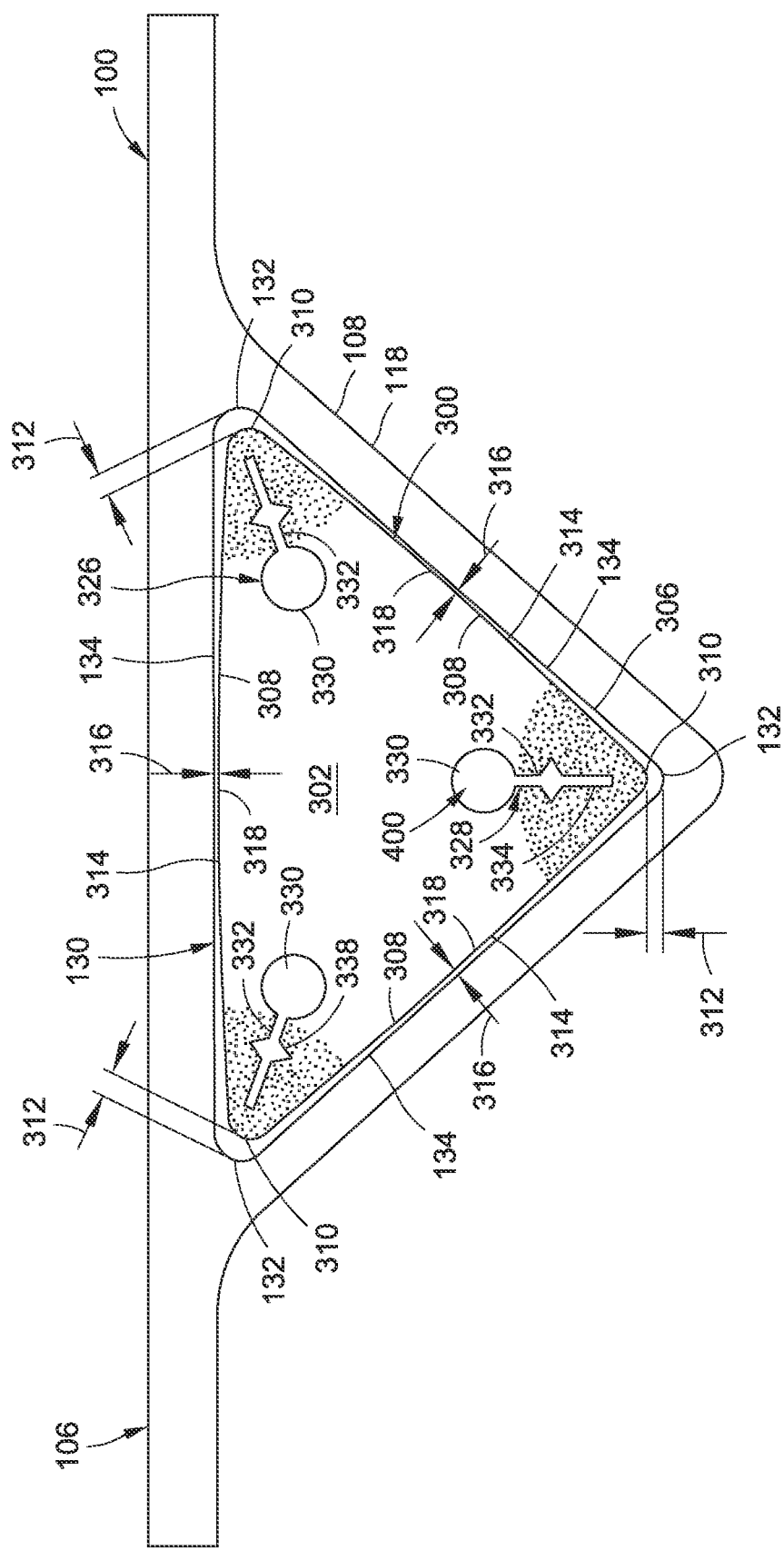
FIG. 7 is an end view illustration of the composite stiffener of FIG. 6 after cure and prior to mandrel extraction and illustrating a vertex gap between each vertex of the mandrel and the corresponding inside radius of the composite laminate cavity.

FIG. 7 is an end view illustration of the composite stiffener 106 of FIG. 6 after cure and prior to extraction of the tooling mandrel 300. After cure, a fluid medium 400 (FIG. 1) may be introduced into the fluid passage network 326 of the tooling mandrel 300. The fluid may flow through one or more of the primary flow passages 330 and/or secondary flow passages 332. As indicated above, in one embodiment, the fluid medium 400 may be at a temperature lower than the temperature of the tooling mandrel 300 resulting in heat transfer from the tooling mandrel 300 to the fluid medium 400. A reduction in the temperature of the tooling mandrel 300 may result in thermal contraction of the mandrel cross-sectional shape 306.

For example, FIG. 7 illustrates a vertex gap 312 produced between each vertex 310 of the tooling mandrel 300 and the corresponding inside radius 132 of the composite laminate cavity 130 as a result of heat transfer from the tooling mandrel 300 to the fluid medium 400 flowing through the primary flow passages 330 and/or secondary flow passages 332. In the example of FIG. 7, thermal contraction may be localized at each one of the three (3) vertices 310 of the tooling mandrel 300 due to the location of the primary flow passage 330 and secondary flow passage 332 proximate each vertex 310. Thermal contraction at other portions of the tooling mandrel 300 that are spaced further away from the primary and/or secondary flow passages 330, 332 may be reduced relative to the thermal contraction at the vertices 310. For example, in FIG. 7, a relatively small non-vertex gap 316 may be produced between a non-vertex portion 314 of the mandrel side 308 and the flat 134 of the composite laminate cavity 130. In some examples, one or more of the mandrel sides 308 may remain in contact with the composite laminate cavity 130 while other portions of the tooling mandrel 300 thermally contract due to heat transfer from the tooling mandrel 300 to the fluid medium 400. For example, one or more of the mandrel sides 308 may remain in contact with the composite laminate cavity 130 at a tangent 318 of the mandrel side 308 which may assume a curved shape due to localized thermal contraction at the vertices 310 of the tooling mandrel 300.

Referring still to FIG. 7, the mandrel material (not shown), the type and flow rate of the fluid medium 400 (FIG. 1), and the size, shape, and location of the primary flow passages 330 (FIG. 1) and secondary flow passages 332 (FIG. 1) may be selected to achieve a desired change in the mandrel cross-sectional shape 306 (FIG. 1). In one example, a mandrel material (not shown) may have a CTE (not shown) that may be higher than the CTE (not shown) of the composite laminate 118 (FIG. 1) to achieve an increased amount of thermal contraction of the tooling mandrel 300 (FIG. 1) and a greater amount of separation between the tooling mandrel 300 and the composite laminate cavity 130

(FIG. 1) relative to the amount of separation achievable using a tooling mandrel 300 having a CTE that is substantially similar to the CTE of the composite laminate 118. In another example, a liquid 402 (FIG. 1) (e.g., water) may be selected as the fluid medium 400 to provide higher thermal conductivity than a gas 404 (FIG. 1) (e.g., air, nitrogen) to produce a relatively higher rate of heat transfer between the tooling mandrel 300 and the fluid medium 400 (FIG. 1) flowing through the primary and/or secondary flow passages 330, 332. The relatively high rate of heat transfer provided by a liquid 402 (FIG. 1) may result in a relatively large vertex gap 312 (FIG. 7) at each one of the vertices 310 (FIG. 7) which may further facilitate extraction of the tooling mandrel 300 from the composite laminate cavity 130.

In a still further example, the fluid medium 400 (FIG. 1) may be a phase change material 406 (FIG. 1) which may transition from a liquid state (not shown) at room temperature (not shown) to a relatively incompressible fluid (not shown—e.g., a semi-solid state) at or above cure temperature of the composite laminate 118 (FIG. 1). In some examples, the fluid passage network 326 (FIG. 1) may be filled with liquid phase change material 406, and then the fluid passage network 326 may be sealed and the phase change material 406 may be heated to a temperature at or above cure temperature of the composite laminate 118 causing the phase change material 406 to transition to a semi-solid state (not shown) or solid state (not shown) causing the tooling mandrel 300 to have approximately the same level of incompressibility (not shown) as a solid mandrel (not shown) that is devoid of a fluid passage network. Such phase change material 406 may provide an increased level of compaction pressure (not shown) to facilitate debulking and curing of the composite laminate 118. In still other examples, the fluid medium 400 may be a relatively incompressible fluid (not shown) such as water (not shown) or a water-based solution (not shown) that remains in an incompressible state such as a liquid state (not shown) when heated to the elevated temperatures required for debulking and/or curing the composite laminate 118.

FIG. 8 is a perspective view illustration of an example of a tooling mandrel 300 having a fluid interface 410 on a first mandrel end 322 and a return fitting 424 on a second mandrel end 324. The fluid interface 410 may be configured to be mounted on the first mandrel end 322 and may provide the fluid medium 400 (FIG. 1) to the fluid passage network 326. In addition, the fluid interface 410 in FIG. 8 may be configured to discharge the fluid medium 400 from the fluid passage network 326. In some examples, the fluid interface 410 may have a cross-sectional shape that may be substantially similar to or equivalent to the cross-sectional shape of the tooling mandrel 300, and may be configured to be installed with the tooling mandrel 300 inside the composite laminate cavity 130. However, in other embodiments not shown, the fluid interface 410 may have a cross-sectional shape that is different than tooling mandrel 300 and the fluid interface 410 may be configured to be fluidly coupled to the tooling mandrel 300 but may be located outside of the composite laminate cavity 130.

In FIG. 8, the fluid interface 410 may have opposing end walls 412. One of the end walls 412 of the fluid interface 410 may be configured to engage or mate with the first mandrel end 322. The end wall 412 facing the first mandrel end 322 may include a quantity of connectors 416 for insertion into a corresponding quantity of primary flow passages 330 that may be formed in the mandrel body 302. The opposite end wall 412 of the fluid interface 410 may also include one or more connectors 416 which may function as an inflow port 418 and an outflow port 420. The inflow port 418 and the outflow port 420 may be engaged to fluid conduits 454 (FIG. 10) to respectively provide a fluid medium 400 (FIG. 10) from a fluid source 452 (FIG. 10) to the tooling mandrel 300, and discharge the fluid medium 400 from the tooling mandrel 300 into a fluid collector 456 (FIG. 10). The connectors 416 may be provided with one or more engagement features (not shown) such as barbs (not shown) to mechanically engage the interior surface (not shown) of the primary flow passages 330 and/or the fluid conduits 454 (FIG. 10). In some examples, the fluid interface 410 may be permanently assembled with the tooling mandrel 300. For example, an end wall 412 of a fluid interface 410 may be adhesively bonded to the first mandrel end 322 using an adhesive sealant (not shown). When the end wall 412 of the fluid interface 410 is adhesively bonded to the first mandrel end 322, the adhesive sealant (not shown) may seal the primary flow passages 330 and/or secondary flow passages 332 against leakage of fluid medium 400 (FIG. 10) at the interface between the fluid interface 410 and the first mandrel end 322.

In FIG. 8, the tooling mandrel 300 may include may include at least two spaced, parallel, primary flow passages 330 extending along a lengthwise direction 116 (FIG. 2) of the mandrel body 302 and containing fluid medium 400 flowing in opposite directions. The opposing flow in the two of more primary flow passages 330 may be achieved by including a fluid return 422 on the second mandrel end 324 of the tooling mandrel 300. The fluid return 422 may be configured to direct the fluid medium 400 received from one of the primary flow passages 330 into an opposite direction in another one of the primary flow passages 330. In an example not shown, the fluid return 422 may be integrally formed into the second mandrel end 324 of the mandrel body 302.

In FIG. 8, the fluid return 422 may be configured as a return fitting 424 that may be mounted to the second mandrel end 324. The return fitting 424 may include one or more return grooves 426 that may be configured to fluidly connect the ends of the primary flow passages 330 in a manner directing the fluid medium 400 received from one or more of the primary flow passages 330 into an opposite direction in another one or more of the primary flow passages 330. In one embodiment, the return fitting 424 may be configured as a metallic fitting or as a non-metallic fitting and may be formed by casting, injection molding, machining, or other means. The return fitting 424 may be releasably or permanently mounted to the second mandrel end 324. For example, the return fitting 424 may be adhesively bonded to the second mandrel end 324 using an adhesive sealant (not shown) which may seal off the primary flow passages 330 and/or secondary flow passages 332 against leakage of fluid medium 400 (FIG. 10) at the interface between the return fitting 424 and the second mandrel end 324. In some examples, the return fitting 424 may have a cross-sectional shape that may be substantially similar to the cross-sectional shape of the tooling mandrel 300, and may be configured to be at least partially contained within the composite laminate cavity 130. In other examples, the return fitting 424 may have a cross-sectional shape that is different than tooling mandrel 300, and/or the return fitting 424 may be located outside of the composite laminate cavity 130. As indicated above, the fluid interface 410 may also be adhesively bonded to the first mandrel end 322 using an adhesive sealant to seal off the primary flow passages 330 and/or secondary flow passages 332 against leakage of fluid medium 400 (FIG. 10) at the interface between the fluid interface 410 and the first mandrel end 322.

FIG. 9 is a sectional view of the tooling mandrel 300 of FIG. 8 showing the fluid interface 410 mounted on the first mandrel end 322 and the return fitting 424 mounted on the second mandrel end 324. The fluid interface 410 may include an inflow port 418 that may direct the fluid medium 400 into an internal manifold 414 for distributing the fluid medium 400 into the two (2) upper primary flow passages 330. The fluid interface 410 may include an outflow port 420 that may receive the return flow of fluid medium 400 from the lower primary flow passage 330. As indicated above, the return fitting 424 may fluidly couple two or more primary flow passages 330 and may direct the fluid medium 400 received from the upper primary flow passages 330 into an opposite direction in the lower primary flow passage 330. Although not shown, the lower primary flow passage 330 may have a larger diameter than the diameters of the upper primary flow passages 330. In one example, the cross-sectional area of the lower primary flow passage 330 may be approximately equivalent to the combined cross-sectional area of the upper primary flow passages 330 such that the combined volumetric flow rate capability of the upper primary flow passages 330 is matched to the lower primary flow passage 330.

FIG. 10 shows the flow of the fluid medium 400 in opposite directions through the tooling mandrel 300. As indicated above, the fluid interface 410 on the first mandrel end 322 may include one or more connectors 416 functioning as an inflow port 418 and one or more connectors 416 functioning as an outflow port 420. The inflow port 418 may be fluidly coupled to a fluid source 452 by a fluid conduit 454. The inflow port 418 may receive the fluid medium 400 from the fluid source 452 for distribution into one or more of the primary flow passages 330 in the tooling mandrel 300. The outflow port 420 may be fluidly coupled to a fluid collector 456 by a fluid conduit 454. The outflow port 420 may discharge the fluid medium 400 from one or more of the primary flow passages 330 into the fluid collector 456 after flowing through the tooling mandrel 300. Advantageously, locating the fluid source 452 and the fluid collector 456 at a single end of the tooling mandrel 300 may simplify the process of extracting the tooling mandrel 300 from one end of the composite laminate cavity 130.

Referring still to FIG. 10, in consideration of the possibility that the fluid medium 400 returning to the outflow port 420 may be at a temperature at or near the temperature of the tooling mandrel 300 and therefore may have reduced capability for absorbing heat from the portions of the tooling mandrel 300 surrounding the returning fluid medium 400, it may be desirable to alternately switch the flow direction of the fluid medium 400 through the fluid passage network 326 by decoupling the inflow port 418 and outflow port from respective fluid source 452 and fluid collector 456, and re-coupling the outflow port 420 to the colder-temperature fluid medium 400 contained in the fluid source 452, and re-coupling the inflow port 418 to the fluid collector 456. In this manner, the flow direction of the fluid medium 400 may be periodically switched to allow heat from all portions of the mandrel body 302 (FIG. 1) to transfer into the fluid medium 400 in a uniform manner until a desired amount of thermal contraction of the tooling mandrel 300 is achieved prior to applying an extraction force (not shown) for removal of the tooling mandrel 300 from the composite laminate cavity 130 (FIG. 1).

FIG. 11 is a perspective view illustration of an example of a tooling mandrel 300 configured for the flow of fluid medium 400 along a single direction through the tooling mandrel 300. The tooling mandrel 300 may include a fluid interface 410 mounted to the first mandrel end 322 and a fluid interface 410 mounted to the second mandrel end 324. The fluid interface 410 on the first mandrel end 322 and/or the fluid interface 410 on the second mandrel end 324 may be releasably or permanently coupled to the tooling mandrel 300 such as by adhesive bonding in a manner described above. The fluid interface 410 on the first and second mandrel ends 322, 324 may each be configured similar to the fluid interface 410 described above with regard to FIGS. 8-10. However, in the example of FIG. 11, the fluid interface 410 on the first mandrel end 322 may be limited to one or more inflow ports 418 and no outflow ports 420. Likewise, the fluid interface 410 on the second mandrel end 324 may be limited to one or more outflow port 420 and no inflow ports 418.

FIG. 12 shows the tooling mandrel 300 with the fluid interfaces 410 mounted to the first mandrel end 322 and the second mandrel end 324. Each one of the fluid interfaces 410 may include one or more connectors 416 for coupling to the primary flow passages 330 of the fluid passage network 326. The fluid interface 410 on the first mandrel end 322 may include an internal manifold 414 configured to receive the fluid medium 400 at the inflow port 418 and distribute the fluid medium 400 into one or more primary flow passages 330. In the example shown, the manifold 414 may distribute the fluid medium 400 into three (3) primary flow passages 330. The fluid interface 410 on the second mandrel end 324 may also include an internal manifold 414 configured to receive the fluid medium 400 from the three (3) primary flow passages 330 and discharge the fluid medium 400 out of the outflow port 420.

FIG. 13 shows the flow of the fluid medium 400 through the primary flow passages 330 along a single direction from the first mandrel end 322 to the second mandrel end 324. The fluid interface 410 on the first mandrel end 322 may include an inflow port 418 receiving the fluid medium 400 from a fluid source 452 through a fluid conduit 454. The fluid interface 410 on the second mandrel end 324 may include an outflow port 420 for discharging the fluid medium 400 into a fluid collector 456 after flowing through the tooling mandrel 300.

In any one of the embodiments disclosed herein, the fluid interfaces 410 may be removed from the tooling mandrel 300 prior to curing the composite laminate 118. Alternatively, the fluid interfaces 410 may remain assembled with the tooling mandrel 300 and sealed to the cure tool 200 under the vacuum bag 210 during curing of the composite laminate 118. After curing of the composite laminate 118 and removal of the vacuum bag 210, the fluid source 452 and the fluid collector 456 may be fluidly connected to the fluid interfaces 410 using one or more fluid conduits 454. A controller 450 (FIG. 1) may be operably coupled to the fluid source 452 and may control the distribution of the fluid medium 400 into the fluid passage network 326. For example, the controller 450 may include a pump (not shown) for pumping the fluid medium 400 from the fluid source 452 into a fluid interface 410.

The controller 450 (FIG. 1) may be configured to initiate and control the flow of the fluid medium 400 through the tooling mandrel 300. In this regard, the controller 450 may regulate the flow rate of the fluid medium 400 through the fluid passage network 326. In one example, the controller 450 may provide a relatively constant flow rate of the fluid medium 400 to the tooling mandrel 300. Alternatively, the controller 450 may be configured to adjust (e.g., increase or decrease) the flow rate of the fluid medium 400 through the tooling mandrel 300 as a means to adjust the rate of heat transfer between the tooling mandrel 300 and the fluid medium 400. For example, for a fluid medium 400 at a temperature lower than the tooling mandrel 300, the controller may increase the flow rate of the fluid medium 400 through the tooling mandrel 300 which may result in a faster rate of heat transfer between the tooling mandrel 300 and the fluid medium 400. A faster rate of heat transfer may correspond to increased thermal contraction of the mandrel cross-sectional shape 306 and increased separation between the tooling mandrel 300 and the composite laminate cavity 130. For example, in FIG. 7, an increased rate of heat transfer may result in an increase in the size of the vertex gap 312 at each vertex 310 which may facilitate extraction of the tooling mandrel 300 with reduced extraction force (not shown).

Figure 14:
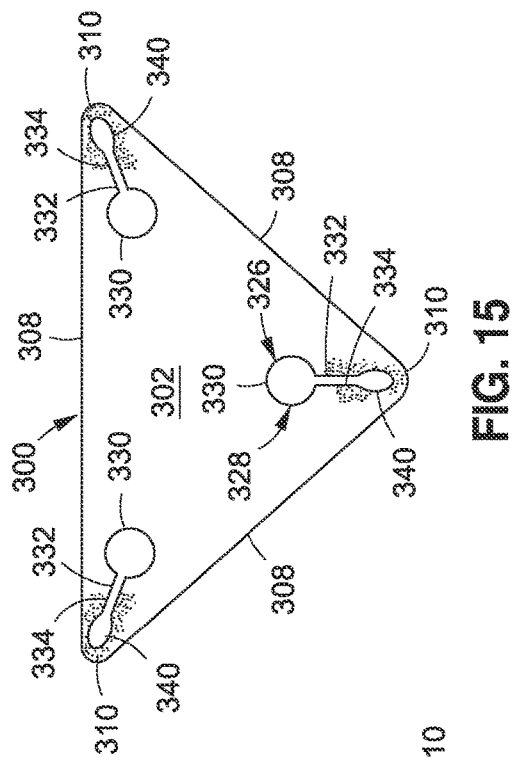
FIG. 14 is an illustration of an example of a tooling mandrel having a primary flow passage located proximate a vertex of the tooling mandrel and having a secondary flow passage with a tortuous configuration.
Figure 15:
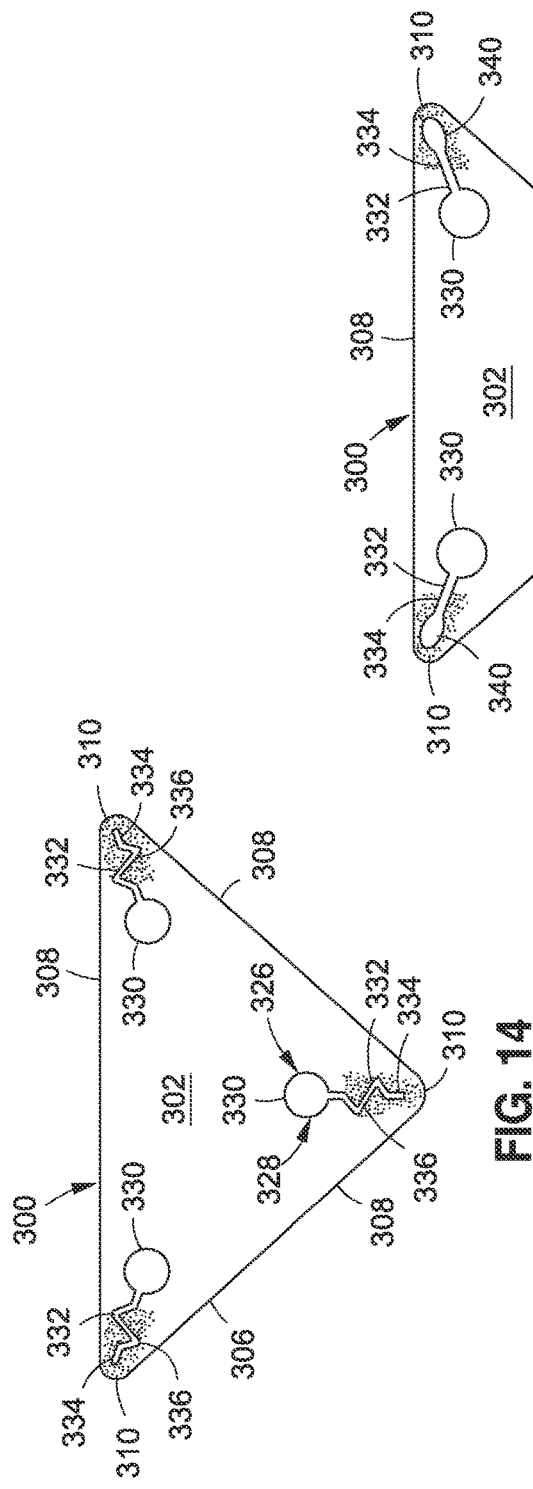
FIG. 15 is an illustration of an example of a tooling mandrel having a secondary flow passage with a bulb-shaped portion.
Figure 16:
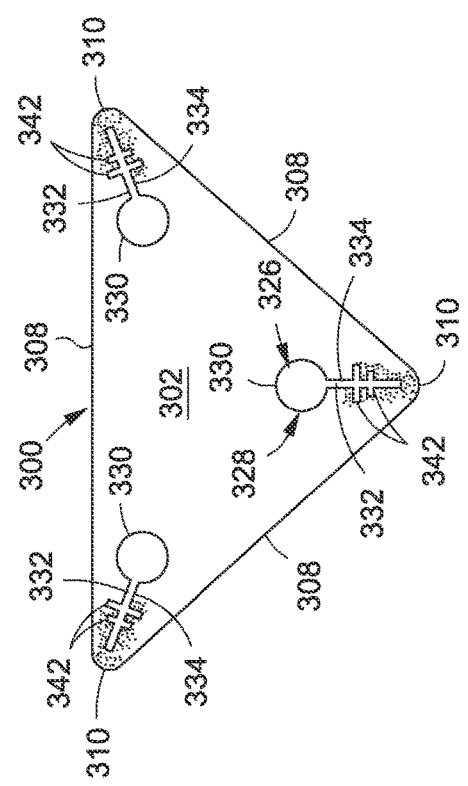
FIG. 16 is an illustration of an example of a tooling mandrel having a secondary flow passage including a series of parallel grooves oriented transverse to the secondary flow passage.

FIGS. 14-16 are non-limiting examples of alternative configurations of the geometry of the secondary flow passages 332. FIG. 14 shows a tooling mandrel 300 having three (3) primary flow passages 330 respectively located proximate the three (3) vertices 310 of the tooling mandrel 300. Each primary flow passage 330 includes a secondary flow passage 332 extending from the primary flow passage 330 toward a vertex 310. In the example shown, the secondary flow passage 332 has a slot shape 334 with a non-straight or tortuous configuration 336. The tortuous configuration 336 of the secondary flow passage 332 may have a greater passage length than a straight configuration (not shown) which may result in an increase in the passage cross-sectional area 328. As indicated above, a relatively large passage cross-sectional area 328 may result in an increase in the heat flow rate between the tooling mandrel 300 and the fluid medium 400 relative to the heat flow rate provided by a smaller passage cross-sectional area 328.

FIG. 15 shows a tooling mandrel 300 having generally straight secondary flow passages 332. Each one of the secondary flow passages 332 has a slot shape 334 extending from the primary flow passages 330. The terminal end of each secondary flow passage 332 includes a bulb-shaped portion 340. The bulb-shaped portion 340 may be located proximate a vertex 310 to provide a localized increase in passage cross-sectional area 328 near the vertex 310. The increase in passage cross-sectional area 328 near the vertex 310 may result in a local increase in thermal contraction of the vertex 310 due to an increase in heat transfer rate from the vertex 310 to the fluid medium 400 in the bulb-shaped portion 340.

In FIG. 15, the increase in thermal contraction at the vertex 310 may result in an increase in the vertex gap 312 (FIG. 7) which may promote extraction of the tooling mandrel 300 from the composite laminate cavity 130. The size and location of the bulb-shaped portion 340 may be selected to alter the passage cross-sectional area 328 as a means to provide a desired rate of heat transfer from the tooling mandrel 300 to the fluid medium 400 at the vertex 310. As indicated above, for examples wherein the fluid medium 400 is at a colder temperature than the tooling mandrel 300, a change in the heat transfer rate between the tooling medium and the fluid medium 400 may affect the amount of thermal contraction of the tooling mandrel 300. An increase in the heat transfer rate may which may increase the amount of separation between the tooling mandrel 300 and the composite laminate cavity 130 which may have an effect on the magnitude of the extraction force required to remove the tooling mandrel 300 from the composite laminate cavity 130.

FIG. 16 shows a tooling mandrel 300 having secondary flow passages 332 each having a generally straight slot shape 334 extending from a primary flow passage 330 toward a vertex 310. Each secondary flow passage 332 includes a pair of parallel grooves 342 oriented transverse to the slot shape 334. Variations in the geometry of the parallel grooves 342 may affect the heat transfer rate between the tooling mandrel 300 and the fluid medium 400 flowing through the secondary flow passages 332. For example, the width, spacing, length, and/or location of the parallel grooves 342 may be selected to provide desired heat transfer characteristics between the vertex 310 and the fluid medium 400 and which may affect the thermal contraction characteristics of the tooling mandrel 300 at the vertex 310.

Figure 17:
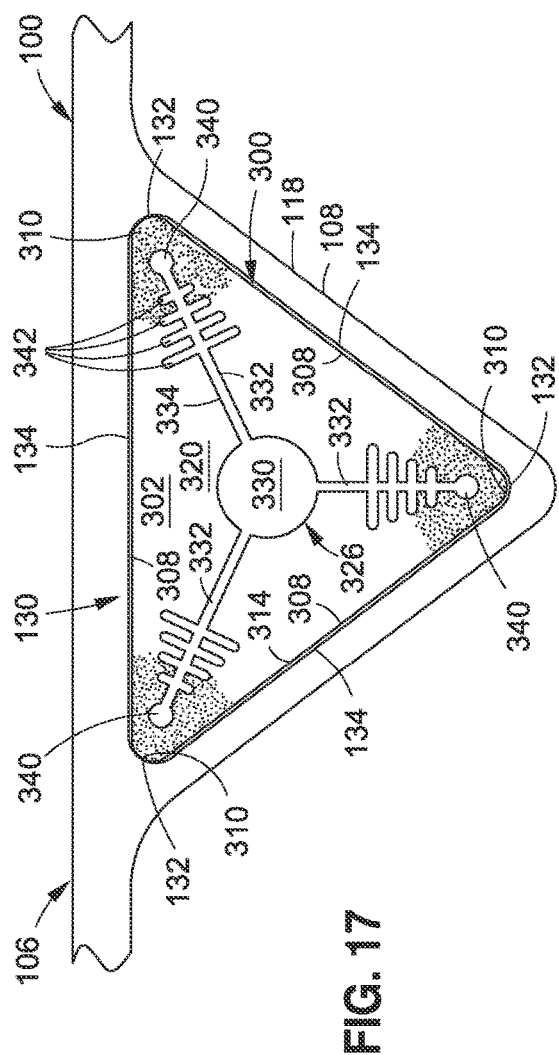
FIG. 17 is an illustration of an example of a tooling mandrel inside a composite laminate cavity of a composite stiffener prior to cure and illustrating a primary flow passage located proximate a central portion of the tooling mandrel and including secondary flow passages extending toward each one of the vertices of the tooling mandrel.

FIG. 17 is an illustration of an example of a tooling mandrel 300 inside a composite laminate cavity 130 of a composite laminate 118 prior to cure. The tooling mandrel 300 includes a fluid passage network 326 having a primary flow passage 330 located proximate a central portion 320 of the tooling mandrel 300. The tooling mandrel 300 additionally includes three (3) secondary flow passages 332 extending outwardly from the primary flow passage 330 toward the three (3) vertices 310 of the tooling mandrel 300. The single primary flow passage 330 in the central portion 320 may have a relatively larger diameter than the diameter of the multiple primary flow passages 330 of the tooling mandrels 300 of FIGS. 14-16. The relatively larger diameter of the single primary flow passage 330 in FIG. 17 may allow the single primary flow passage 330 to provide a sufficient flow volume of fluid medium 400 through the tooling mandrel 300 for achieving the desired heat transfer rate between the tooling mandrel 300 and the fluid medium 400.

In FIG. 17, each one of the secondary flow passage 332 has a generally straight slot shape 334 extending toward a vertex 310 of the tooling mandrel 300. In addition, each one of the secondary flow passages 332 includes a series of parallel grooves 342 similar to the configuration described above regard to FIG. 16. The parallel grooves 342 in each one of the secondary flow passages 332 may be positioned at a location proximate a vertex 310 of the tooling mandrel 300. Each secondary flow passage 332 may further include a bulb-shaped portion 340 at a terminal end of the slot shape 334 which may result in a localized increase in the heat transfer rate between the fluid medium 400 portion and the vertex 310 relative to the heat transfer rate between the fluid medium 400 at other portions of the tooling mandrel 300.

In any of the tooling mandrel 300 (FIG. 1) examples disclosed herein, the fluid passage network 326 (FIG. 1) may include one or more secondary flow passages 332 (FIG. 1) that may be configured differently than other secondary flow passages 332 (FIG. 1) in the same fluid passage network 326 (FIG. 1). Likewise, any one or more of the primary flow passages 330 (FIG. 1) in a fluid passage network 326 (FIG. 1) may be configured differently than one or more of the other primary flow passages 330 (FIG. 1) in the same fluid passage network 326 (FIG. 1). The geometry of the primary flow passages 330 (FIG. 1) and/or the secondary flow passages 332 (FIG. 1) may be selected based upon the amount of thermal contraction that is desired at a given location of the tooling mandrel 300 (FIG. 1). For example, the fluid passage network 326 (FIG. 1) of a tooling mandrel 300 (FIG. 1) may be configured such that majority of the passage cross-sectional area 328 (FIG. 1) is located proximate one or more of the vertices 310 (FIG. 1) of the tooling mandrel as a means to provide increased heat transfer between the tooling mandrel 300 (FIG. 1) and the fluid medium 400 (FIG. 1) at the vertex 310 (FIG. 1) relative to heat transfer at other locations of the tooling mandrel 300 (FIG. 1). In this manner, the increased heat transfer may provide increased thermal contraction at the vertex 310 (FIG. 1) for an increase in the size of the vertex gap 312 (FIG. 1) at each vertex 310 (FIG. 1) which may facilitate extraction of the tooling mandrel 300 (FIG. 1) from the composite laminate cavity 130 (FIG. 1).

Figure 18:
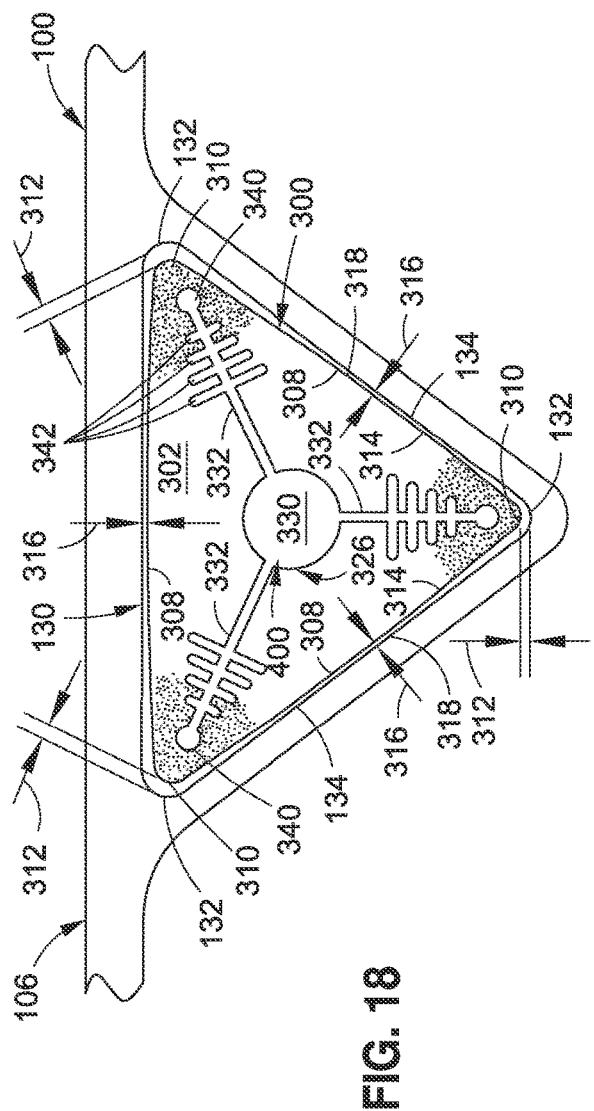
FIG. 18 is an illustration of the tooling mandrel and composite stiffener of FIG. 17 after cure and prior to mandrel extraction and illustrating a vertex gap between each vertex of the mandrel and corresponding inside radius of the composite laminate cavity.

FIG. 18 shows the thermal contraction of the tooling mandrel 300 relative to the composite laminate cavity 130 of the composite laminate 118 of FIG. 17 after cure and prior to mandrel extraction. Similar to the above-described tooling mandrel 300 example shown in FIG. 7, thermal contraction of the tooling mandrel 300 of FIG. 18 may be localized at each one of the three (3) vertices 310 due to the location of the primary and secondary flow passages 330, 332 at each vertex 310. Thermal contraction of the tooling mandrel 300 at other locations further from the primary and/or secondary flow passages 330, 332 may be reduced relative to the thermal contraction at the vertices 310. However, the centrally located primary flow passage 330 may produce a relatively large non-vertex gap 316 between the mandrel side 308 and the flat 134 of the composite laminate cavity 130 relative to the smaller size of the non-vertex gap 316 in the tooling mandrel 300 of FIG. 7. In this manner, the relatively larger non-vertex gap 316 in FIG. 18 may facilitate a reduction in the extraction force required to remove the tooling mandrel 300 from the composite laminate cavity 130.

Figure 19:
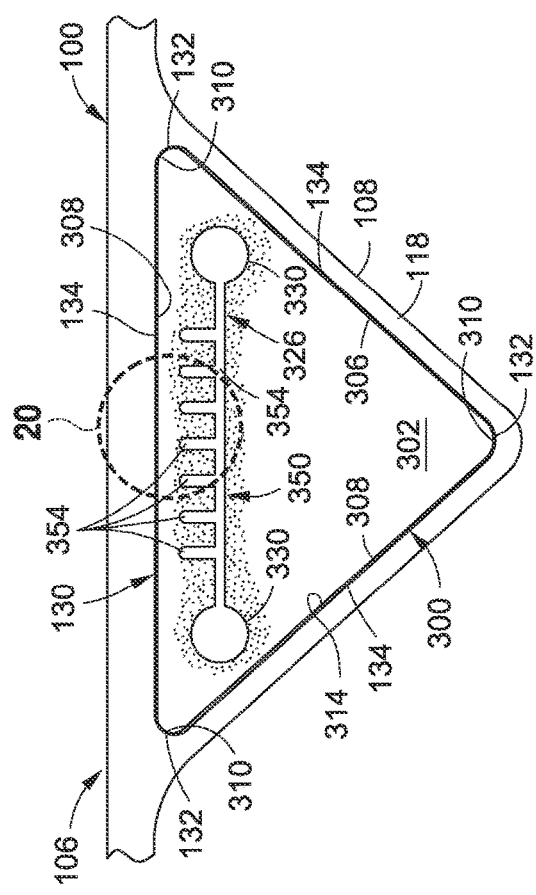
FIG. 19 is an illustration of the tooling mandrel prior to cure and having a fluid flow slot coupling a pair of primary flow passages.

FIG. 19 shows a further example of a tooling mandrel 300 inside a composite laminate cavity 130 of a composite laminate 118 prior to cure. The tooling mandrel 300 includes a fluid passage network 326 having a fluid flow slot 350 formed along an upper mandrel side 308 of the tooling mandrel 300. The fluid flow slot 350 may fluidly connect a parallel pair of spaced primary flow passages 330 which may extend along a lengthwise direction 116 (FIG. 2) of the tooling mandrel 300. The fluid flow slot 350 may extend along the lengthwise direction 116 (FIG. 2) of the pair of primary flow passages 330. Each one of the primary flow passages 330 is shown located proximate a vertex 310 of the tooling mandrel 300. The fluid flow slot 350 is shown oriented generally parallel to the upper mandrel side 308. Although a single fluid flow slot 350 is shown, any number may be provided. In addition, a tooling mandrel 300 may include one or more fluid flow slots 350 at any location in the tooling mandrel 300.

Figure 20:
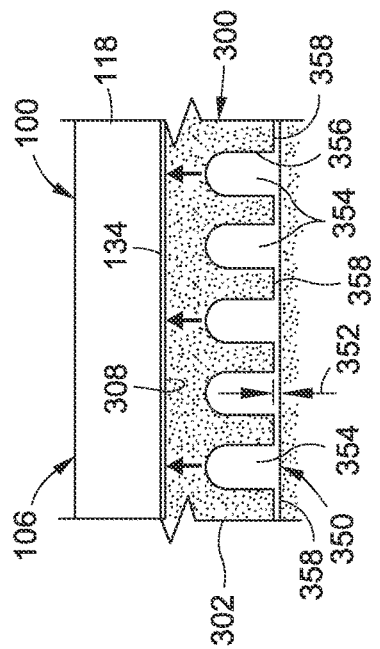
FIG. 20 is a magnified illustration of a portion of the tooling mandrel taken along line 20 of FIG. 19 and illustrating a plurality of tertiary slots extending laterally from the fluid flow slot.

FIG. 20 is a magnified view of a portion of the tooling mandrel 300 of FIG. 19 and illustrates a plurality of tertiary slots 354 that may extend from the fluid flow slot 350. Although shown as being oriented approximately perpendicularly to the fluid flow slot 350 and parallel to one another and having the same height and uniform spacing, the tertiary slots 354 may be provided in any one or more orientations and/or in a non-uniform spacing and/or non-uniform height. The tertiary slots 354 may be separated by slot side walls 356. Each one of the slot side walls 356 may have a foot 358 which may form a slot gap 352 with a lower wall of the fluid flow slot 350. The slot gaps 352 may be sized and configured to permit the flow of the fluid medium 400 between the pair of primary flow passages 330. In addition, the slot gap 352 may be sized and configured such that the feet 358 of the slot side walls 356 bear against the bottom of the fluid flow slot 350 to support the composite laminate 118 against compaction pressure (not shown) as may be applied during debulking and/or curing of the composite laminate 118.

Figure 21:
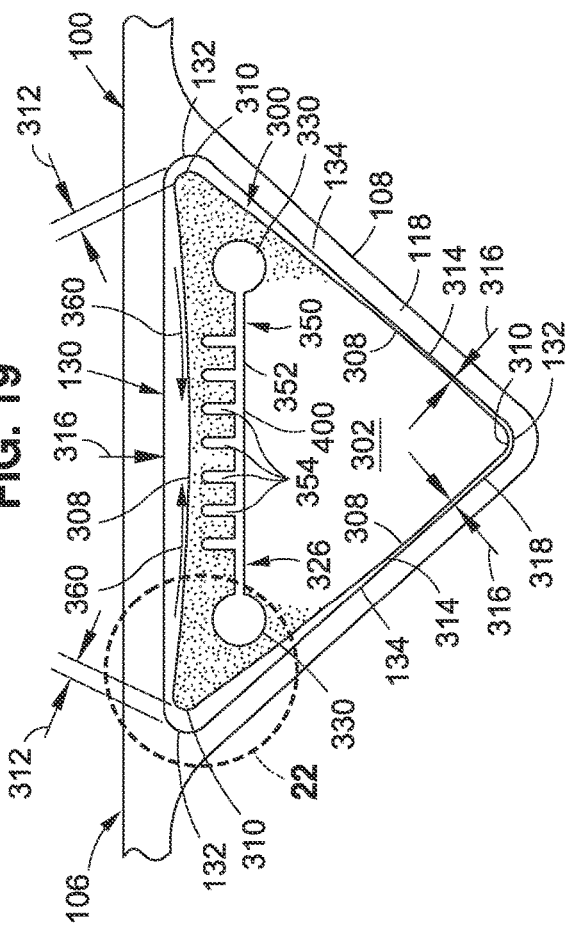
FIG. 21 is an illustration of the tooling mandrel and composite stiffener of FIG. 19 after cure and prior to mandrel extraction and illustrating the vertex gap at each one of the vertices and a non-vertex gap at a non-vertex portion of the tooling mandrel.

FIG. 21 shows the tooling mandrel 300 and composite stiffener 106 of FIG. 19 after cure and prior to mandrel extraction. Also shown is a general direction of shrinkage 360 of the tooling mandrel 300 from each one of the of the upper vertices 310 toward a central portion of the mandrel side 308. The direction of shrinkage 360 may be a result of heat transfer between the tooling mandrel 300 and the fluid medium 400 flowing through the fluid flow slot 350 and the tertiary slots 354. At a lower portion of the tooling mandrel 300, non-vertex gaps 316 of relatively small size may be produced between the tooling mandrel 300 and the composite laminate cavity 130 due to a reduced amount of heat transfer from the lower portion into the fluid medium 400 due to the relatively long distance to the fluid flow slot 350.

Figure 22:
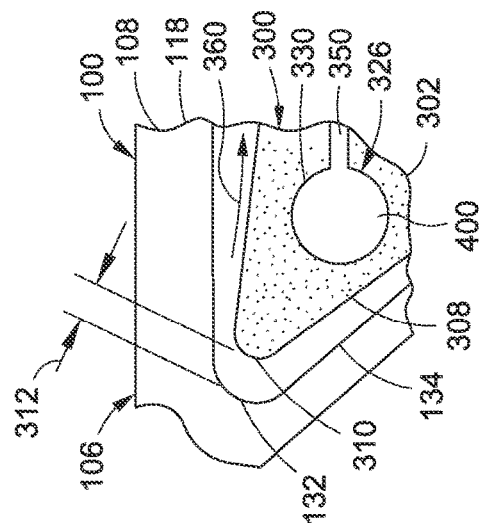
FIG. 22 is a magnified illustration of a portion of the tooling mandrel taken along line 22 of FIG. 21 and illustrating the vertex gap between the vertex of the tooling mandrel and the inside radius of the composite laminate cavity.

FIG. 22 is a magnified view of a portion of the tooling mandrel 300 of FIG. 21. Shown is the vertex gap 312 that may be produced between a vertex 310 and the inside radius 132 of the composite laminate cavity 130 as a result of heat transfer from the tooling mandrel 300 to the fluid medium 400 flowing through the primary flow passage 330. Also shown is the direction of shrinkage 360 of the tooling mandrel along the upper mandrel side 308 and which may be the result of heat transfer into the fluid medium 400 in the fluid flow slot 350 and the tertiary slots 354.

FIG. 23 shows an example of a tooling mandrel 300 inside a hat section 114 composite stiffener 106 prior to cure. The tooling mandrel 300 may include four vertices 310 interconnected by four flats 134 to define the composite laminate cavity 130. In this regard, a wrap laminate (not shown) of the hat section 114 composite stiffener 106 may be formed by laying up composite plies (not shown) around the tooling mandrel 300 in the same manner described above with regard to forming the wrap laminate 124 (FIG. 5) of the triangle section 108 composite laminate 118 (FIG. 5). The tooling mandrel 300 in FIG. 23 may include a primary flow passage 330 and a secondary flow passage 332 proximate each one of the vertices 310. In the example shown, the secondary flow passage 332 may have a slot shape 334 with a diamond-shaped portion 338 to provide a local increase in the passage cross-sectional area 328 to facilitate a localized increase in the heat transfer rate between the tooling mandrel 300 and the fluid medium 400 in the primary and secondary flow passages 332 at the vertices 310.

FIG. 24 shows the tooling mandrel 300 of FIG. 23 after cure and prior to mandrel extraction. The flow of the fluid medium 400 at a cooler temperature than the tooling mandrel 300 may result in thermal contraction of the tooling mandrel 300. In this regard, a vertex gap 312 may be formed between each vertex 310 and corresponding inside radius 132 of the composite laminate cavity 130 as a result of heat transfer from the tooling mandrel 300 into the fluid medium 400 in the primary and secondary flow passages 330, 332 proximate each vertex 310. A smaller non-vertex gap 316 may also be produced at one or more non-vertex portions 314 of the tooling mandrel 300 which may further facilitate extraction of the tooling mandrel 300 from the composite laminate cavity 130.

Figure 25:
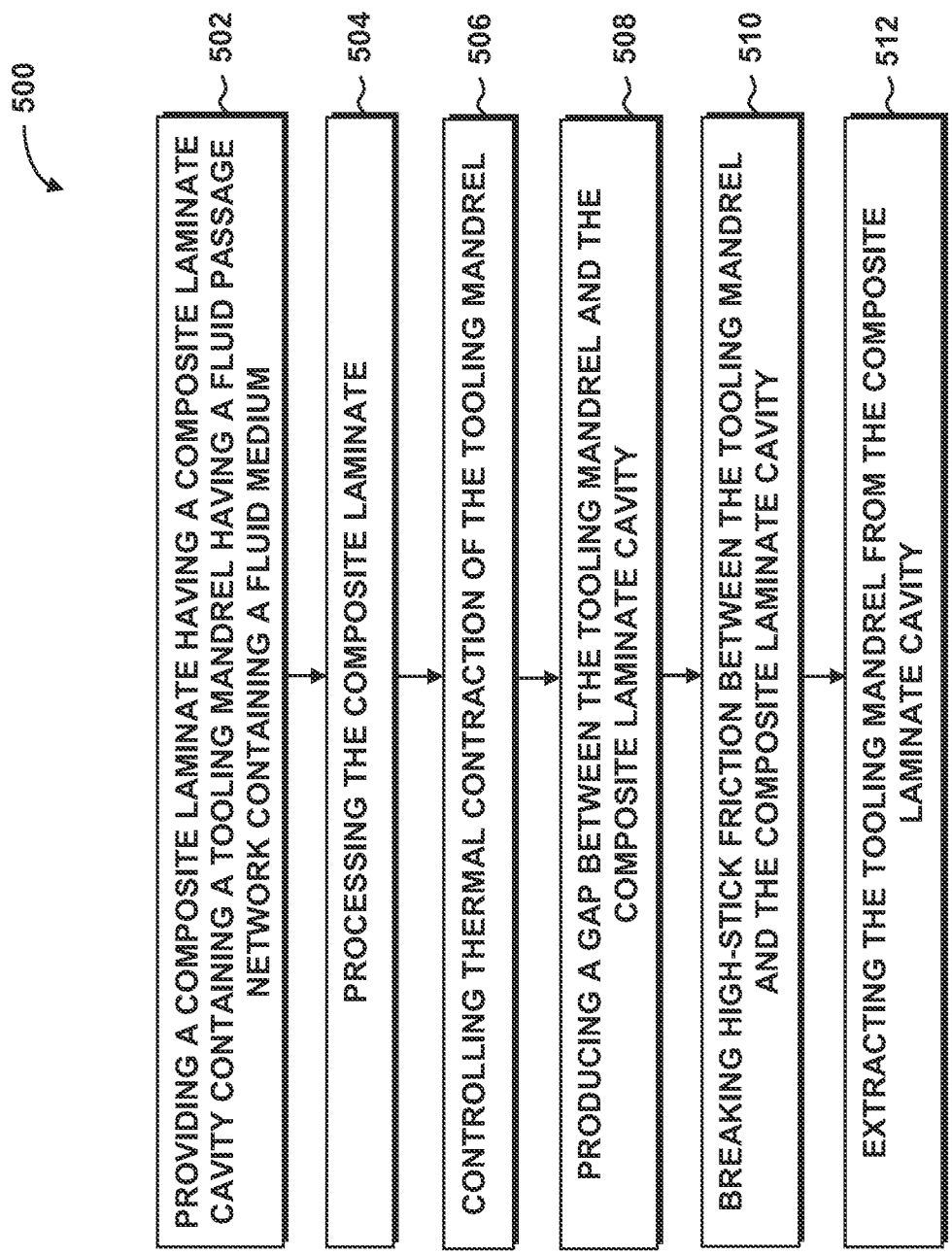
FIG. 25 is an illustration of a flowchart having one or more operations that may be included in a method of extracting a tooling mandrel from a composite laminate cavity.

FIG. 25 is an illustration of a flowchart having one or more operations that may be included in a method 500 of extracting a tooling mandrel 300 (FIG. 1) from a composite laminate cavity 130 (FIG. 1). Although the method 500 is described below in the context of a triangle section 108 (FIG. 4) composite stiffener 106 as shown in FIG. 4, the method 500 may be implemented for manufacturing a composite laminate 118 (FIG. 1) of any shape or configuration having a cavity 130. Advantageously, the method 500 may cause thermal contraction of the tooling mandrel 300 (FIG. 1) to facilitate extraction of the tooling mandrel 300 (FIG. 1) from a cured composite laminate 118. For example, the method 500 may cause thermal contraction in the vertices 310 (FIG. 1) and particularly at locations forming acute angles (not shown) in the composite laminate cavity 130 (FIG. 1) and thereby reducing or eliminating high-stick friction (not shown) at such vertices 310 to facilitate extraction of the tooling mandrel 300 from the composite laminate cavity 130 with reduced extraction force (not shown).

In the presently-disclosed method 500 of FIG. 25, Step 502 may include providing a composite laminate 118 (FIG. 1) having a composite laminate cavity 130 (FIG. 1) containing a tooling mandrel 300 (FIG. 1). In one example, the composite laminate 118 may be formed by laying up composite plies 120 (FIG. 1) around a tooling mandrel 300 to form a wrap laminate 124 (FIG. 5) as mentioned above. The method 500 may further include laying up composite plies 120 in a cure tool cavity 202 (FIG. 6) to form a primary laminate 122 (FIG. 5), and assembling the wrap laminate 124 with the primary laminate 122, a base laminate 126 (FIG. 5), and one or more radius fillers 128 (FIG. 5) to form a composite laminate 118. As indicated above, the composite plies 120 (FIG. 1) may be formed of thermosetting (not shown) or thermoplastic (not shown) prepreg composite material (not shown) or the composite plies 120 may be formed of dry fiber material (not shown) that may be later infused with thermosetting resin (not shown) or thermoplastic resin (not shown).

Step 504 of the method 500 of FIG. 25 may include processing the composite laminate 118 (FIG. 1) with a tooling mandrel 300 (FIG. 1) located in the composite laminate cavity 130 (FIG. 1). The processing of the composite laminate 118 may include debulking and/or curing the composite laminate 118 to form a composite structure 100 (FIG. 1). The method may include applying a vacuum bag 210 (FIG. 1) over the composite laminate 118 containing the tooling mandrel 300, and sealing the vacuum bag 210 to a cure tool 200 (FIG. 1) using edge sealant 214 (FIG. 1) as mentioned above and shown in FIG. 6. The method may further include positioning the vacuum-bagged composite laminate 118 (FIG. 1) and tooling mandrel 300 (FIG. 1) in an autoclave 204 (FIG. 1) and applying heat 206 (FIG. 1) and/or autoclave pressure 208 (FIG. 1) to debulk and/or cure the composite laminate 118 (FIG. 1). The tooling mandrel 300 (FIG. 1) may support the composite laminate 118 (FIG. 1) during the application of autoclave pressure 208 (FIG. 1). In this regard, the tooling mandrel 300 (FIG. 1) may be formed of material configured to thermally expand by a predetermined amount during the cure cycle to react against the externally-applied autoclave pressure 208 (FIG. 1).

As an alternative to autoclave curing, the method may include curing the composite laminate 118 (FIG. 1) in an out-of-autoclave process (not shown) such as in an oven (not shown) wherein compaction pressure (e.g., atmospheric pressure—not shown) may be applied to the composite laminate 118 (FIG. 1) by drawing a vacuum on the vacuum bag 210 (FIG. 1). During the curing process, the temperature of the composite laminate 118 (FIG. 1) may be elevated and maintained at one or more cure temperatures for one or more hold periods until the completion of cure after which the temperature of the composite laminate 118 may be allowed to reduce such as by discontinuing the application of heat.

Step 506 of the method 500 of FIG. 25 may include controlling thermal contraction of the tooling mandrel 300 (FIG. 1). The step of controlling thermal contraction of the tooling mandrel 300 may include passing a fluid medium 400 (FIG. 1) through a fluid passage network 326 (FIG. 1) formed in the tooling mandrel 300 such as after the composite laminate 118 (FIG. 1) has been processed (e.g., cured). The method 500 may further include transferring heat from the tooling mandrel 300 to the fluid medium 400 to cause thermal contraction of the tooling mandrel 300. In this regard, the method may include distributing the fluid medium 400 (FIG. 1) into the fluid passage network 326 (FIG. 1) at a first mandrel end 322 (FIG. 8) of the tooling mandrel 300 (FIG. 1). For example, the method may include drawing the fluid medium 400 (FIG. 1) from a fluid source 452 (FIG. 10) into a fluid interface 410 (FIG. 8) at the first mandrel end 322 (FIG. 8) of the mandrel body 302 (FIG. 8), passing the fluid medium 400 (FIG. 1) through the fluid passage network 326 (FIG. 1), and discharging the fluid medium 400 (FIG. 1) through a fluid interface 410 (FIG. 8) located at a second mandrel end 324 (FIG. 8) opposite the first mandrel end 322 (FIG. 8).

In an alternative embodiment, the method may include drawing the fluid medium 400 (FIG. 1) into the fluid passage network 326 (FIG. 1) at the first mandrel end 322 (FIG. 8) of the mandrel body 302 (FIG. 8), and discharging the fluid medium 400 (FIG. 1) from the fluid passage network 326 (FIG. 1) at the same mandrel end into which the fluid medium 400 (FIG. 1) is drawn. In such an arrangement, the tooling mandrel 300 (FIG. 8) may include a fluid return 422 (FIG. 8) at a second mandrel end 324 (FIG. 8) for fluidly coupling two or more primary flow passages 330 (FIG. 8) to facilitate flow of the fluid medium 400 (FIG. 8) in opposite directions the tooling mandrel 300 (FIG. 8). As indicated above, for the embodiment of FIG. 8, the flow of the fluid medium 400 through the fluid passage network 326 may be periodically reversed by periodically switching the connection (not shown) of the inflow port 418 and outflow port with the fluid source 452 and fluid collector 456. In this manner, the flow direction of the fluid medium 400 through the tooling mandrel 300 may be periodically reversed until a desired amount of thermal contraction is achieved for the tooling mandrel 300 (FIG. 8) to allow for extraction of the tooling mandrel 300 with reduced extraction force (not shown).

As indicated above, the fluid passage network 326 (FIG. 1) of a tooling mandrel 300 (FIG. 1) may include one or more primary flow passages 330 (FIG. 1) through which the fluid medium 400 (FIG. 1) may be passed. In one example, one or more primary flow passages 330 (FIG. 1) may be located proximate one or more vertices 310 (FIG. 7) of the tooling mandrel 300. In another example, the tooling mandrel 300 (FIG. 1) may include at least one primary flow passage 330 (FIG. 1) located proximate a central portion 320 (e.g., a geometric center—see FIG. 17) of the tooling mandrel 300 (FIG. 1). The method 500 may include passing the fluid medium 400 (FIG. 1) through one or more primary flow passages 330 as may be located proximate a central portion 320 and/or one or more vertices 310 (FIG. 1) of the tooling mandrel 300. The method 500 may further include increasing thermal contraction of the tooling mandrel 300 by changing the location and/or the passage cross-sectional area 328 (FIG. 1) of the primary flow passage 330. For example, the diameter (not shown) of one or more primary flow passages 330 may be increased to increase the surface area (not shown) along which heat from the tooling mandrel 300 may transfer into the fluid medium 400 flowing through the primary flow passages 330. The increased surface area may increase the rate of heat transfer from the tooling mandrel 300 to the fluid medium 400 which may increase thermal contraction of the tooling mandrel 300 in the area of the primary flow passage 330.

In another example, to increase thermal contraction at a specific location of the tooling mandrel 300 (FIG. 1) such as at a vertex 310 (FIG. 1) of the tooling mandrel 300 (FIG. 1), the primary flow passage 330 (FIG. 1) may be located near the vertex 310 to allow for increased heat transfer from the vertex 310 to the fluid medium 400 relative to the heat transfer at other locations of the tooling mandrel 300. The increased heat transfer at the vertex 310 may result in increased thermal contraction at the vertex 310 which may break high-stick friction (not shown) between the vertex 310 (FIG. 1) and the inside radius 132 (FIG. 1) of the composite laminate cavity 130 (FIG. 1) which may facilitate extraction of the tooling mandrel 300 from the composite laminate cavity 130. In a further example, the heat transfer rate between the tooling mandrel 300 and the fluid medium 400 may be changed by changing the flow rate of the fluid medium 400 through the tooling mandrel 300. For example, an increase in the flow rate of the fluid medium 400 through the tooling mandrel 300 may increase the heat transfer rate between the tooling mandrel 300 and the fluid medium 400, and which may increase thermal contraction at one or more locations of the tooling mandrel 300 such as at the vertices 310 to break high-stick friction and thereby facilitate extraction of the tooling mandrel 300 from the composite laminate cavity 130.

In addition, the method 500 may include passing the fluid medium 400 (FIG. 1) through one or more secondary flow passages 332 (FIG. 1), one or more of which may extending laterally outwardly from one or more of the primary flow passages 330 (FIG. 1). In the example shown in FIGS. 6-7 and 14-18, one or more of the secondary flow passages 332 may extend toward a vertex 310 of the tooling mandrel 300. The method 500 may include passing the fluid medium 400 through one or more primary flow passages 330 and one or more secondary flow passages 332 which may extend laterally from the primary flow passage 330, as described above. For example, the method 500 may include passing the fluid medium 400 through a secondary flow passage 332 extending from the primary flow passage 330 toward a vertex 310 of the tooling mandrel 300. In the same manner described above with regard to the primary flow passages 330, the method 500 may include increasing thermal contraction of the tooling mandrel 300 by changing the location and the passage cross-sectional area 328 (FIG. 1) of the primary flow passages 330 and/or the secondary flow passages 332.

In still other examples, the method may include passing a fluid medium 400 (FIG. 1) through a fluid flow slot 350 (FIG. 19) fluidly coupling two or more primary flow passages 330 (FIG. 19) that may extend along a lengthwise direction 116 (FIG. 2) of the tooling mandrel 300 (FIG. 19), as described above and illustrated in FIGS. 19-22. In such an arrangement, thermal contraction of the tooling mandrel 300 (FIG. 19) may occur at the vertices 310 (FIG. 19) located proximate the primary flow passages 330 (FIG. 19). In addition, thermal contraction of the tooling mandrel 300 (FIG. 19) may occur along a mandrel side 308 (FIG. 19) proximate the fluid flow slot 350 (FIG. 19).

The method 500 may include passing into the tooling mandrel 300 (FIG. 1) a fluid medium 400 (FIG. 1) that is at a lower temperature than the tooling mandrel 300 (FIG. 1) to promote hear transfer from the tooling mandrel 300 (FIG. 1) to the fluid medium 400 (FIG. 1). For example, a liquid 402 (FIG. 1) such as relatively cold water (not shown) may be passed through the tooling mandrel 300. In another example, a gas 404 (FIG. 1) such as nitrogen (not shown) or relatively cold air (not shown) may be passed through the tooling mandrel 300 (FIG. 1). However, as indicated above, in an alternative embodiment, the method may include passing through the tooling mandrel 300 (FIG. 1) a fluid medium 400 (FIG. 1) that is at a higher temperature than the tooling mandrel 300 (FIG. 1) to promote thermal expansion of the tooling mandrel 300 (FIG. 1) which may assist in increasing the compaction pressure (not shown) on the composite laminate 118 (FIG. 1). As mentioned above, compaction pressure (not shown) may facilitate the evacuation of moisture and/or gas (not shown) such as volatiles from the composite laminate 118 (FIG. 1) and may facilitate the removal of wrinkles (not shown) from the composite plies 120 (FIG. 1). In addition, compaction pressure may promote intermingling of the resin (not shown) of adjacent composite plies 120 (FIG. 1) and may conform the outer surfaces (not shown) of the composite plies 120 to the surface contour (not shown) of the cure tool 200 (FIG. 1) and the tooling mandrel 300 (FIG. 1).

The step of controlling thermal contraction of the tooling mandrel 300 (FIG. 1) may include changing the mandrel cross-sectional shape 306 (FIG. 1) in response to transferring heat 206 (FIG. 1) from the tooling mandrel 300 (FIG. 1) to the fluid medium 400 (FIG. 1). In one example, the changing of the mandrel cross-sectional shape 306 (FIG. 1) may include thermal contraction of one or more portions of the tooling mandrel 300 (FIG. 1) to facilitate extraction of the tooling mandrel 300 (FIG. 1) from the composite laminate cavity 130 (FIG. 1) of the composite laminate 118 (FIG. 1) when cured.

Step 508 of the method 500 of FIG. 25 may include producing a gap at one or more locations between the tooling mandrel 300 (FIG. 1) and the composite laminate cavity 130 (FIG. 1). For example, the method 500 may include thermally contracting the tooling mandrel 300 (FIG. 1) in a manner producing a vertex gap 312 (FIG. 7) between one or more vertices 310 (FIG. 1) of the tooling mandrel 300 (FIG. 7) and the corresponding inside radii 132 (FIG. 1) of the composite laminate 118 (FIG. 7). In this regard, thermal contraction of the tooling mandrel 300 (FIG. 7) may reduce or eliminate high-stick friction (not shown) that may occur between the vertices 310 (FIG. 1) of the tooling mandrel 300 and the inside radii 132 of the composite laminate cavity 130, and which may facilitate extraction of the tooling mandrel 300 (FIG. 1) from the composite laminate cavity 130 (FIG. 1). Thermal contraction of the tooling mandrel 300 (FIG. 1) may also result in a non-vertex gap 316 (FIG. 1) at one or more non-vertex portions 314 (FIG. 1) of the tooling mandrel 300 (FIG. 1) and which may also facilitate extraction of the tooling mandrel 300 (FIG. 1). In some examples, the method 500 may include thermally contracting one or more of the vertices 310 (FIG. 1) by an amount greater than a non-vertex portion 314 (FIG. 1) of the tooling mandrel 300 (FIG. 1) as a result of the proximity of the primary and/or secondary flow passages 330, 332 (FIG. 1) to the vertices 310 (FIG. 1) of the tooling mandrel 300 (FIG. 1).

Step 510 of the method 500 of FIG. 25 may include breaking high-stick friction (not shown) between the tooling mandrel 300 (FIG. 1) and the composite laminate cavity 130 (FIG. 1) in response to controlling thermal contraction of the tooling mandrel 300. As indicated above, high-stick friction (not shown) may develop between the tooling mandrel and the composite laminate cavity 130 (FIG. 1) during curing of the composite laminate 118 (FIG. 1) as a result of resin deposits (not shown) between the outer surface (not shown) of the tooling mandrel 300 and the inner surface (not shown) of the composite laminate cavity 130. The step of breaking high-stick friction (not shown) between the tooling mandrel 300 and the composite laminate cavity 130 may include reducing or eliminating high-stick friction at one or more locations between the tooling mandrel 300 and the composite laminate cavity 130. For example, referring to FIG. 7, heat transfer from the tooling mandrel 300 (FIG. 7) to the fluid medium 400 (FIG. 7) flowing through the fluid passage network 326 (FIG. 7) of the tooling mandrel 300 may result in thermal contraction at the acute angle (not shown) vertices 310 (FIG. 7) of the tooling mandrel 300, and which may reduce or eliminate high-stick friction (not shown) at such vertices 310 which may facilitate extraction of the tooling mandrel 300 from the composite laminate cavity 130 with reduced extraction force (not shown).

The method 500 may further include adjusting one or more flow characteristics of the fluid medium 400 (FIG. 1) as a means to control the thermal contraction of the tooling mandrel 300 (FIG. 1). For example, the method 500 may include using a controller 450 (FIG. 1) to regulate the flow rate of the fluid medium 400 (FIG. 1) through the tooling mandrel 300 (FIG. 1) as a means to alter (e.g., increase or decrease) the amount by which the mandrel cross-sectional shape 306 (FIG. 1) changes. For example, the method 500 may include adjusting the flow rate of the fluid medium 400 (FIG. 1) in a manner causing an increase in the cooling of the tooling mandrel 300 (FIG. 1) to thereby produce an increase in the rate and/or the amount of thermal contraction of the tooling mandrel 300 (FIG. 1). In addition, the method 500 may include controlling the amount of time during which the fluid medium 400 (FIG. 1) is circulated through the tooling mandrel 300 (FIG. 1) until the desired amount of thermal contraction of the tooling mandrel 300 (FIG. 1) is achieved.

Step 512 of the method 500 of FIG. 25 may include extracting the tooling mandrel 300 (FIG. 1) from the composite laminate cavity 130 (FIG. 1) after thermally contracting one or more portions of the tooling mandrel 300 (FIG. 1) and/or breaking high-stick friction that may exist between the tooling mandrel 300 and the composite laminate cavity 130. For example, the method 500 may include applying a tension force (not shown) to one end of the tooling mandrel 300 (FIG. 1) to induce axial movement of the tooling mandrel 300 (FIG. 1) relative to the composite laminate cavity 130 (FIG. 1). In this manner, the tooling mandrel 300 (FIG. 1) may be pulled out of one end of the composite laminate cavity 130 (FIG. 1).

Figure 26:
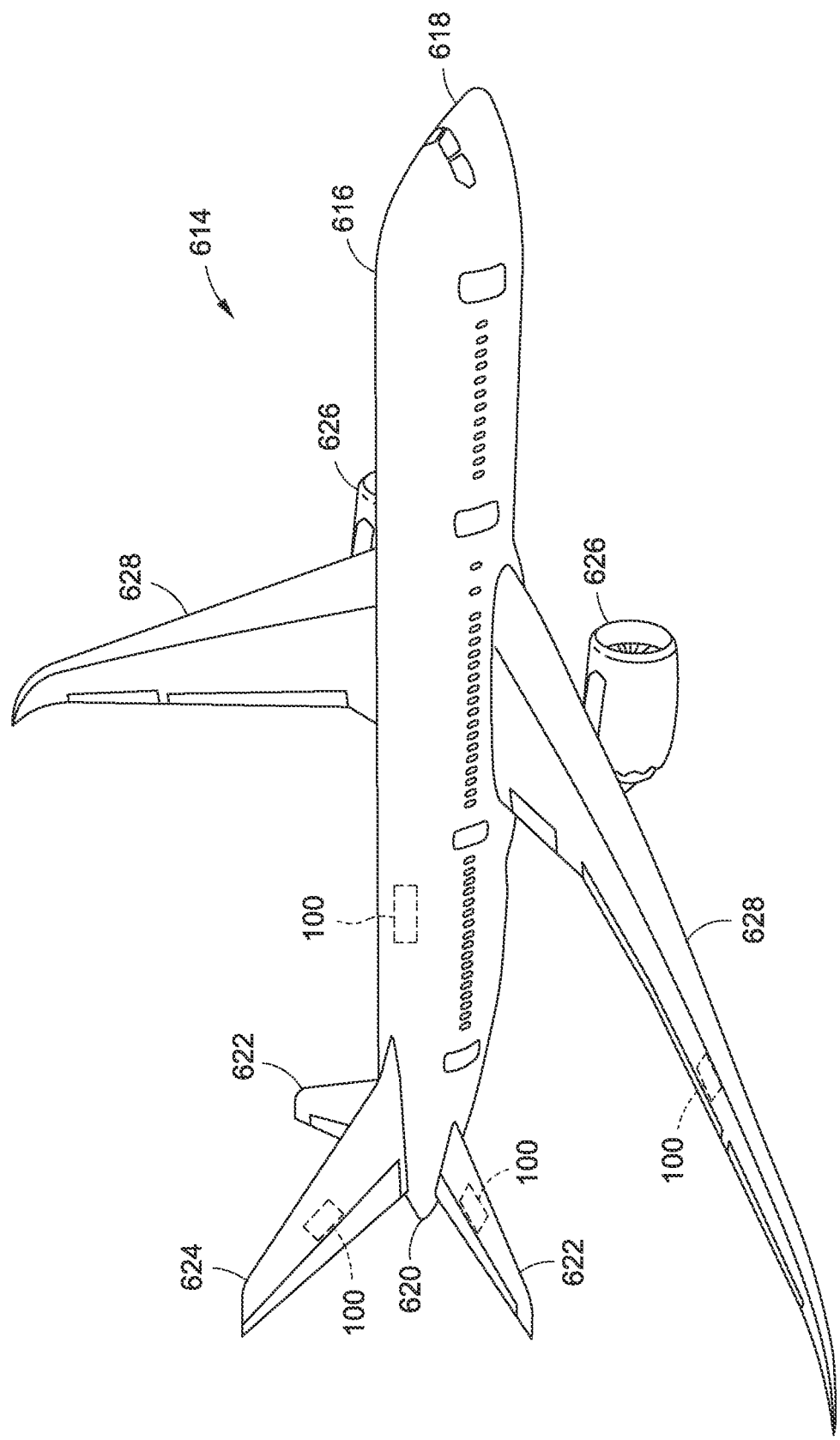
FIG. 26 is an illustration of an aircraft including one or more composite structures that may be manufactured using one or more examples of the tooling mandrel and/or method disclosed herein.

FIG. 26 is an illustration of a perspective view of an aircraft 614 including one or more composite structures 100 that may be manufactured using one or more examples of the tooling mandrel 300 (FIG. 1) and/or method 500 (FIG. 25) disclosed herein. The aircraft 614 may include a fuselage 616 having a nose 618 at a forward end and an empennage 620 at an aft end. The empennage 620 may include a vertical tail 624 and one or more horizontal tails 622. In addition, the aircraft 614 may include a pair of wings 628 extending outwardly from the fuselage 616. One or more propulsion units 626 may be included with the aircraft 614. For example, the propulsion that may be supported on the wings 628.

Although FIG. 26 is generally representative of a commercial aircraft 614, the tooling mandrel 300 (FIG. 1) and/or method 500 (FIG. 25) disclosed herein may be implemented for manufacturing composite structures 100 for any type of aircraft including commercial, civilian, and military aircraft including fixed-wing aircraft, rotary-wing aircraft and any one of a variety of other types of air vehicles. Furthermore, the tooling mandrel 300 (FIG. 1) and/or method 500 (FIG. 25) disclosed herein may be implemented for manufacturing composite structures 100 that may be used on space vehicles including, but not limited to, missiles, rockets, launch vehicles, satellites. In addition, the tooling mandrel 300 (FIG. 1) and/or method 500 (FIG. 25) may be implemented for manufacturing composite structures 100 for land-based vehicles including any type of motor vehicles and any type of watercraft. In this regard, the tooling mandrel 300 (FIG. 1) and/or method 500 (FIG. 25) may be implemented for forming composite structures 100 for any type of vehicular or non-vehicular application, without limitation, including any type of system, assembly, subassembly, or structure including buildings and other land-based structures.

Figure 27:
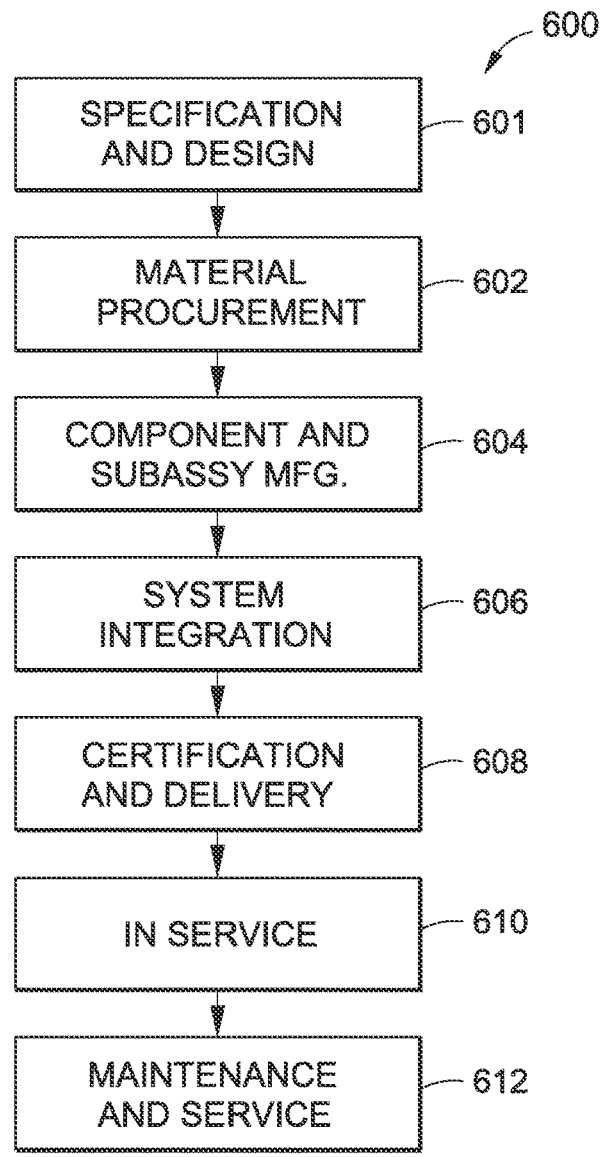
FIG. 27 is an illustration of a flow diagram of an aircraft production and service methodology.
Figure 28:
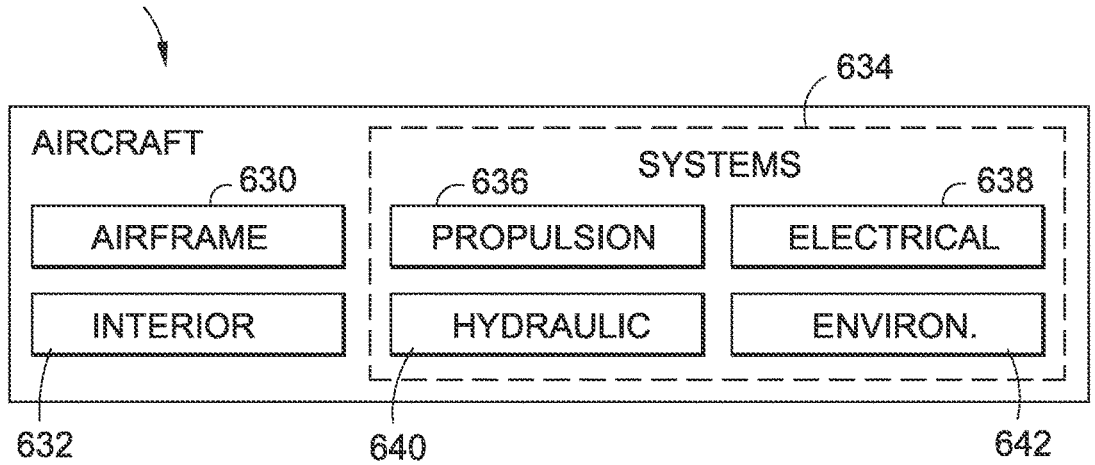
FIG. 28 is an illustration of a block diagram of an aircraft.

Referring to FIG. 27, embodiments of the present disclosure may be described in the context of an aircraft manufacturing and service method 600 as shown in FIG. 27 and an aircraft 614 as shown in FIG. 28. During pre-production, exemplary method 600 may include specification and design 601 of the aircraft 614 and material procurement 602. During production, component and subassembly manufacturing 604 and system integration 606 of the aircraft 614 takes place. Thereafter, the aircraft 614 may go through certification and delivery 608 in order to be placed in service 610. While in service 610 by a customer, the aircraft 614 is scheduled for routine maintenance and service 612 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 28, the aircraft 614 produced by exemplary method 600 may include an airframe 630 with a plurality of high-level systems 634 and an interior 632. Examples of high-level systems 634 include one or more of a propulsion system 636, an electrical system 638, a hydraulic system 640, and an environmental system 642. Any number of other systems 634 may be included. The presently-disclosed tooling mandrel 300 (FIG. 1) and method 500 (FIG. 25) may be implemented during production, component and/or subassembly manufacturing 604 of the aircraft 614 and/or during system integration 606 of the aircraft 614. For example, the tooling mandrel 300 (FIG. 1) and/or method 500 (FIG. 25) may be implemented for manufacturing composite structures 100 (FIG. 1) that may be incorporated into the airframe 630 such as the fuselage 616, the vertical tail 624, the horizontal tails 622, and/or the wings 628. The tooling mandrel 300 (FIG. 1) and method 500 (FIG. 25) may also be implemented for manufacturing any one or more components that may be included in one or more high-level system 634 and/or in the interior 632 of the aircraft 614. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process may be fabricated or manufactured in a manner similar to components or subassemblies produced while the aircraft 614 is in service. Also, one or more apparatus embodiments, method embodiments, or a combination thereof may be utilized during the production stages and, for example, by substantially expediting assembly of or reducing the cost of an aircraft 614. Similarly, one or more of apparatus embodiments, method embodiments, or a combination thereof may be utilized while the aircraft 614 is in service, for example and without limitation, in maintenance and service 612.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of extracting a tooling mandrel from a composite laminate cavity of a composite laminate, comprising the steps of:
    processing the composite laminate;
    passing, after processing the composite laminate, a fluid medium through a fluid flow slot of a fluid passage network extending lengthwise through the tooling mandrel located inside the composite laminate cavity, the fluid medium having a temperature lower than the tooling mandrel for transferring heat from the tooling mandrel into the fluid medium, the fluid flow slot located proximate and parallel to a mandrel side extending between a pair of vertices of the tooling mandrel and including tertiary slots separated by slot side walls; and
    locally thermally contracting the tooling mandrel along a direction parallel to the mandrel side and which extends from each one of the vertices toward a central portion of the mandrel side in a manner forming a non-vertex gap between the mandrel side and the composite laminate larger than the non-vertex gap between the composite laminate and the tooling mandrel at a portion of the tooling mandrel opposite the fluid flow slot due to a longer distance to the fluid flow slot at the portion opposite the fluid flow slot for breaking high-stick friction between the tooling mandrel and the composite laminate.

2. The method of claim 1, wherein passing the fluid medium through the fluid flow slot of the fluid passage network includes:
    drawing the fluid medium into the fluid passage network at a first mandrel end; and
    discharging the fluid medium from the fluid passage network at the first mandrel end.

3. The method of claim 1, further including:
    producing, in response to passing the fluid medium through the fluid flow slot, the vertex gap between at least one vertex and an inside radius of the composite laminate.

4. The method of claim 1, further including:
    extracting the tooling mandrel from the composite laminate cavity.

5. The method of claim 1, wherein:
    the fluid passage network includes at least one primary flow passage located proximate one of a vertex and a central portion of the tooling mandrel.

6. The method of claim 5, further comprising:
    a secondary flow passage in fluid communication with the primary flow passage; and
    the secondary flow passage extending from the primary flow passage toward the vertex of the tooling mandrel.

7. The method of claim 5, wherein:
    the at least one primary flow passage comprises a pair of primary flow passages, each one of the primary flow passages being located proximate a vertex of the tooling mandrel; and
    the fluid flow slot fluidly coupling the pair of primary flow passages.

8. The method of claim 1, wherein:
    the tooling mandrel is formed of elastomeric material.

9. The method of claim 1, wherein:
    the tooling mandrel is formed of a mandrel material having a coefficient of thermal expansion (CTE) that is higher than the CTE of the composite laminate.

10. The method of claim 1, wherein:
    the fluid medium is a liquid.

11. The method of claim 1, further comprising:
    controlling, using a controller operably coupled to a fluid source, a flow rate of the fluid medium through the fluid passage network.

12. The method of claim 11, wherein controlling the flow rate of the fluid medium comprises:
    increasing, using the controller, the flow rate of the fluid medium through the fluid passage network, and causing an increase in a rate of heat transfer between the tooling mandrel and the fluid medium for increasing a size of the vertex gap at each vertex to facilitate extraction of the tooling mandrel.

13. The method of claim 1, wherein passing the fluid medium through the fluid flow slot comprises:
    passing an incompressible fluid through the fluid flow slot.

14. The method of claim 13, wherein passing the incompressible fluid through the fluid flow slot comprises:
    passing one of water or a water-based solution through the fluid flow slot.

15. The method of claim 1, wherein passing the fluid medium through the fluid flow slot comprises:
    passing a gas through the fluid flow slot.

16. The method of claim 15, wherein passing the gas through the fluid flow slot comprises:
    passing one of nitrogen or cold air fluid through the fluid flow slot.

17. The method of claim 1, wherein passing the fluid medium through the fluid flow slot comprises:
    drawing the fluid medium into a first mandrel end of the tooling mandrel, passing the fluid medium through the fluid passage network, and discharging the fluid medium from a second mandrel end of the tooling mandrel opposite the first mandrel end.

18. The method of claim 1, wherein processing the composite laminate comprises:
    curing the composite laminate with the tooling mandrel installed in the composite laminate cavity.

19. The method of claim 18, wherein curing the composite laminate includes:
    applying at least one of heat and pressure to the composite laminate while supporting the composite laminate via the tooling mandrel in the composite laminate cavity.

20. The method of claim 1, further comprising:
    extracting the tooling mandrel from the composite laminate cavity after thermally contracting the tooling mandrel.

* * * * *